United States Patent
Grove et al.

(10) Patent No.: US 7,831,484 B2
(45) Date of Patent: Nov. 9, 2010

(54) SELLER-CONTROLLED PUBLICATION OF QUESTION AND ANSWER SETS

(75) Inventors: Brian Alan Grove, San Jose, CA (US); Zak James Edson, Campbell, CA (US); Steve Grove, San Jose, CA (US); Andrew Leigh Sandler, San Jose, CA (US)

(73) Assignee: eBay Inc., San Jose, CA (US)

( * ) Notice: Subject to any disclaimer, the term of this patent is extended or adjusted under 35 U.S.C. 154(b) by 742 days.

(21) Appl. No.: 10/749,431

(22) Filed: Dec. 30, 2003

(65) Prior Publication Data

US 2005/0015325 A1 Jan. 20, 2005

Related U.S. Application Data

(60) Provisional application No. 60/437,485, filed on Dec. 31, 2002, provisional application No. 60/494,400, filed on Aug. 11, 2003.

(51) Int. Cl.
*G06F 17/30* (2006.01)
(52) U.S. Cl. .......................... 705/27; 705/26
(58) Field of Classification Search .............. 705/26–27
See application file for complete search history.

(56) References Cited

U.S. PATENT DOCUMENTS

| | | | | |
|---|---|---|---|---|
| 4,799,156 A * | 1/1989 | Shavit et al. | .................. | 705/26 |
| 6,671,674 B1 * | 12/2003 | Anderson et al. | ............. | 705/26 |
| 6,748,422 B2 * | 6/2004 | Morin et al. | ................ | 709/206 |
| 7,146,337 B1 * | 12/2006 | Ward et al. | .................... | 705/38 |
| 7,499,871 B1 * | 3/2009 | McBrayer et al. | ............. | 705/11 |
| 2001/0027436 A1 * | 10/2001 | Tenembaum | ................. | 705/38 |
| 2002/0046187 A1 * | 4/2002 | Vargas et al. | .................. | 705/67 |
| 2002/0103746 A1 * | 8/2002 | Moffett, Jr. | .................. | 705/37 |
| 2003/0028441 A1 * | 2/2003 | Barsness et al. | ............... | 705/26 |
| 2003/0041121 A1 * | 2/2003 | Levine | ........................ | 709/219 |
| 2004/0098332 A1 * | 5/2004 | Dvir | ............................. | 705/37 |
| 2004/0215467 A1 * | 10/2004 | Coffman et al. | ................ | 705/1 |
| 2006/0277145 A1 * | 12/2006 | Raccah et al. | ................. | 705/40 |

OTHER PUBLICATIONS

"Snap up a bargain at online auctions," Matthew Wall, Sunday Times, London (UK), Mar. 25, 2001, p. 17.*

* cited by examiner

*Primary Examiner*—Mark Fadok
(74) *Attorney, Agent, or Firm*—Schwegman, Lundberg & Woessner, P.A.

(57) ABSTRACT

An auction mechanism that would allow a buyer to submit a question to a seller, and optionally have the seller post the relevant question as well as a response for inclusion within a listing.

19 Claims, 20 Drawing Sheets

Sell Your Item  Related Links:  • New to Selling?  • Seller Tips  • Fees  • Registration
• Free Shipping Estimates from iShip.com

500

- Your User ID: [        ]
You can also use your email address.

Your Password: [        ]

Title required | [                    ]
(45 characters max; no HTML tags, asterisks, or quotes, as they interfere with Search) see tips.

Category (Choose one category only; be as specific as possible.)
required

Antiques & Art:
[        ▼]

Description required | [                    ]

513
Buy It Now NEW!
Sell your item instantly to the first buyer who meets your specified price.

The Buy It Now price is only available before bids appear.
Learn more

Buy It Now - Special Holiday Promotion

Free during Holiday promotion $ [    ] Enter the Buy It Now price e/g. 20.00 -- Please do not include commas or currency symbols, like $.

Buy It Now is not currently available for multiple item auctions.

We recommended Buy It Now with Instant Purchase through eBay Online Payments (available below.)

[Search] tips
[All Regions ▼]
☐ Search only in Collectibles
☐ Search titles and descriptions

Collectibles

| Advertising | Cultural *cont'd* | Paper *cont'd* |
|---|---|---|
| General | Hawaiiana | Brochures |
| Airlines | Japanese | Documents |
| Auto | Korean | Ephemera |
| Bakery | Latin American | Greeting Cards |
| Bus | Native | Matchbooks |
| Candy | Americana | Menus |
| Cereal | Russian | Newspapers |
| Character | Western | Playing Cards |
| Cigarette | Americana | Postcards |
| Clocks | | Scrapbooks |
| Coffee | Decorative | |
| Dairy | General | Pez |
| Displays | ANRI | General |
| Distillery | Armani | Current |
| Dolls | Avon Works | Vintage (no feet) |

[Search] tips
☑ Search only in Collectibles
☐ Search titles and descriptions Updated: Oct 13, 2000
06:31:09
PDT

Related Topics: China & Pottery Theme Page | Dept 56 | Glass

1069 Bells items in All

| All Items | All items including Gallery preview | Gallery Items |

| Status | Featured Items - Current | Price | Bids | Ends PDT |
|---|---|---|---|---|

There are no featured items in this category.
To find out how to be listed in this section and seen by thousands, please visit this link Featured Auctions

| Status | Current Items - Current | Buy-It-Now Price | Bids | Ends PDT |
|---|---|---|---|---|
| 📷 | 2GOLD Alpine Bells, medium and small | $3.99 | - | 10/23 06:15 |
| 📷 | Pickard China 1980 CHRISTMAS BELL | $15.00 | - | 10/20 06:07 |
| 📷 | Crown and Rose 1979 Xmas bell PEWTER | $12.00 | - | 10/20 06:06 |
| 📷 | Crown & Rose 1978 PEWTER Christmas bell, #1 | $9.95 | - | 10/20 06:05 |
| 📷 | Kaiser (Germany) 1981 Annual Christmas Bell | $12.00 | - | 10/20 06:05 |
| 📷 | Kaiser 1980 Christmas Bell in White Bisque | $12.00 | - | 10/20 06:05 |
| 📷 | Kaiser (Germany) 1979 Annual Christmas Bell | $8.00 | - | 10/20 06:04 |
| 📷 | KAISER Cobalt Blue 1978 Xmas bell, Germany | $8.00 | - | 10/20 06:04 |
| 📷 | Three Bell(s) Some Collectible; Low Price | $5.00 | - | 10/20 06:03 |
| 📷 | Large Crystal Bell with Four Women | $9.99 | - | 10/20 04:47 |

| Description |
|---|
| I HAVE A BENNINGTON POTTERY SHACK TRAY IT IS MARKED ON BACK. IT IS IN MINT |
| Free Honesty Counters Image Hosting, Listing Tools and Message Boards |

| Bidding |
|---|

BENNINGTON POTTERY TRAY
Item #430507896

Opening bid:         $8.99
Your maximum bid:    [       ]

(Minimum bid: $8.99)

520

[Review bid]

eBay will bid on your behalf up to your maximum bid, which is kept secret from other this is called proxy bidding.

Your bid or purchase is a contract - Buy or place a bid only if you're serious about the item. If you are the winning bidder, you will enter into a legally binding contract to purchase the item from the seller.

Buy It Now no longer available - This item was listed with a Buy It Now price which is no longer available since bidding has started. Learn more

How to Bid

1. Register to bid - if you haven't already. It's free!
2. Learn about this seller - read feedback comments left by others.
3. Know the details - read the item description and payment & shipping terms closely.
4. If you have questions - contact the seller inwinning before you bid.
5. Place your bid!

eBay purchases are insured.

Buy It Now Price:   $52.00

Your User ID:   [                    ]
                You can also use your email address.

504

Your Password: [                    ]
                Forgot your password?

Save time by signing in. (You may also sign in securely).

[Buy It Now]  On the next page, you'll be asked for credit card or alternative verification if your card is not already on file with us.
Your credit card will not be charged.

Your purchase is a contract - Buy only if you're serious about the item. You will enter into a legally binding contract to purchase the item from the seller.

SELLER-CONTROLLED PUBLICATION OF QUESTION AND ANSWER SETS

CROSS-REFERENCE TO RELATED APPLICATIONS

This application claims the benefit of U.S. Provisional Application No. 60/437,485, filed Dec. 31, 2002 and U.S. Provisional Application No. 60/494,400 filed Aug. 11, 2003, which are incorporated herein by reference.

TECHNICAL FIELD

The present invention relates generally to the field of network-based commerce and, more specifically, to the facilitation of price negotiations between a buyer and a seller by a network-based auction facility.

BACKGROUND

Many network-based commerce systems have emerged in the past several years. Through network-based commerce systems, potential sellers can enter information about their product or service for potential buyers to bid on. The information submitted by potential sellers is then organized, stored and presented as a listing by the network-based commerce system. Potential buyers can search through the organized seller information to find products or services on which they wish to purchase. A purchase price may be established with respect to a particular listing utilizing one of a number of price-setting mechanisms. For example, a particular commerce system may support one or more of a fixed price-setting mechanism (e.g., the seller publishes a price at which the item is to be sold, this price being fixed) and an auction price-setting mechanism.

Considering an auction price-setting mechanism, once a bidder locates an item (or listing) to bid on, the bidder can compete with other bidders for the item by submitting bids during a specified auction time period. At the end of the specified auction time period, the highest bid bidder is notified and the transaction between the seller and the highest bid bidder is facilitated.

While the current network-based commerce systems work well, a number of significant technical challenges to the automation of the commerce process remain. For example, many items in a network-based commerce system providing an auction price-setting mechanism have at most one bid during the specified auction time. An interested bidder must sometimes wait days for an auction to end even though his or her bid is the only bid received. Also, there are many potential buyers who do not like auction formats.

Another problem occurs when a seller sets an artificially high reserve price for a product listing, which turns out to be higher than any bidder is willing to pay for the Rev. listing and/or higher than a market price for the item. In this situation, the relevant item may not sell.

However, unlike traditional brick and mortar commerce locations that generally have sales representatives to answer questions about a good or service, network-based commerce systems (e.g., websites) may not have the capability to ask questions about the good/service, or the provision of such help functions may be expensive.

SUMMARY OF EMBODIMENTS THE INVENTION

A seller-controlled publication of question and answer sets is described. According to one aspect there is provided an auction mechanism that would allow a buyer to submit a question to a seller, and optionally have the seller post the relevant question as well as a response for inclusion within a listing.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 61D depicts a flow chart illustrating a method, according to an exemplary embodiment of the present invention, to adjust a reserve price and/or a seller-fixed-price offer for a listing based on a buyer request.

FIG. 10 illustrates an exemplary seller interface to receive information on seller's offerings.

FIG. 11 illustrates an exemplary buyer interface to facilitate a buyer in locating items to purchase or bid on.

FIG. 12 illustrates an exemplary item list generated in response to buyer's category selection or search criteria provided in the user interface.

FIG. 13 illustrates an exemplary buyer interface used to receive buyer information including an indication to use the fixed-price purchase process or the auction purchase process.

DETAILED DESCRIPTION

A seller-controlled publication of question and answer sets is described. In the following description, for purposes of explanation, numerous specific details are set forth in order to provide a thorough understanding of the present invention. It will be evident, however, to one skilled in the art that the present invention may be practiced without these specific details.

Terminology

The term "user," "buyer," "seller," and "bidder" shall be taken to refer to any entity, human or automated, that contributes to, or participates in, a transaction, communication or process.

The term "transaction" shall be taken to include any communication or exchange between two or more entities with a view to establishing a business agreement, an exchange of value or a commercial relationship. Accordingly, the word "transaction" shall be deemed to cover, but not be limited to, a purchase-and-sale transaction established as a result, for example, of the placement of an advertisement or as a result of the conclusion of an auction process, the auction process being conducted across a communications network or otherwise.

The term "data file" shall be taken to mean a collection of transaction listings. Accordingly, the phrase "data file" shall be deemed to cover, but not be limited to, a collection of transaction listings, for example, which is being propagated to a network-based transaction facility.

Commerce System

Figure 1:
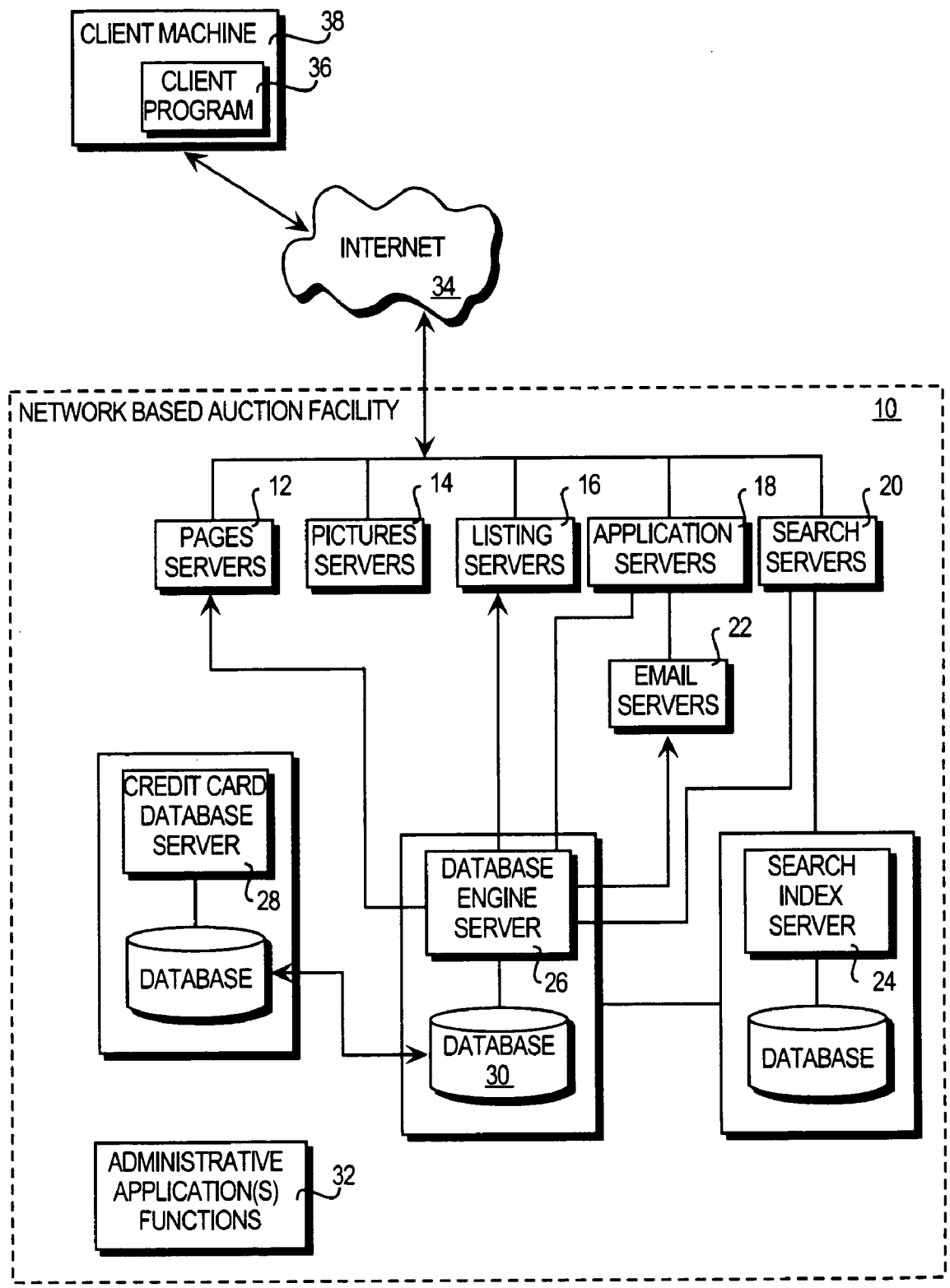
FIG. 1 is a block diagram illustrating an exemplary network-based transaction facility in the form of a network-based commerce system.

FIG. 1 is block diagram illustrating an exemplary network-based commerce system 10. While an exemplary embodiment of the present invention is described within the context of a network-based commerce system 10, the invention will find application in many different types of computer-based, and network-based, facilities, platforms or marketplaces (commerce, transaction or otherwise).

The network-based commerce system 10, in an exemplary embodiment, includes one or more of a number of types of front-end servers that each includes at least one Dynamic Link Library (DLL) to provide certain functionality. Page servers 12 deliver web pages (e.g., markup language documents), picture servers 14 dynamically deliver images to be displayed within web pages, listing servers 16 facilitate category-based browsing of listings, search servers 20 that handle search requests to the network-based commerce system 10 and facilitate keyword-based browsing of listings, and application servers 18 provide an intelligent interface to the back-end of the network-based commerce system 10. E-mail servers 22 provide, inter alia, automated e-mail communications to users of the network-based commerce system 10. Application servers 18 provide a set of functions (e.g., defined by an Application Program Interface (API)) for querying the network-based commerce system 10. These queries include getting information on items, getting user information, listing items, etc. Application functions are invoked via an HTTP transport protocol request from an application.

The page servers 12, picture servers 14, listing servers 16, application servers 18, search servers 20, e-mail servers 22 and database engine server 26 may individually, or in combination, act as a communication engine to facilitate communications between, for example, the client machine 38 and the network-based commerce system 10. In addition, the page servers 12, picture servers 14, listing servers 16, application servers 18, search servers 20, e-mail servers 22 and database engine server 26 may individually, or in combination, act as a transaction engine to facilitate transactions between, for example, the client machine 38 and the network-based commerce system 10. Furthermore, the page servers 12, picture servers 14, listing servers 16, application servers 18, search servers 20, e-mail servers 22, and database engine server 26 may individually, or in combination, act as a display engine to facilitate the display of items (e.g., as listings) on a client machine 38.

The back-end servers include a database engine server 26, a search index server 24 and a credit card database server 28, each of which maintains and facilitates access to a respective database.

The network-based commerce system 10 may be accessed by a client program, such as for example a browser 36 (e.g., a Internet Explorer browser distributed by Microsoft Corp. of Redmond, Wash.) that executes on a client machine 38 and accesses the network-based commerce system 10 via a network such as, for example, the Internet 34. Other examples of networks that a client may utilize to access the network-based commerce system 10 include a wide area network (WAN), a local area network (LAN), a wireless network (e.g., a cellular network), or the Public Switched Telephone Network (PSTN) network.

Further, while the environment described above with reference to FIG. 1 employs a client-server architecture, it will be appreciated that a peer-to-peer (or distributed) architecture may also be employed to support the network-based commerce system.

Database Structure

Figure 2:
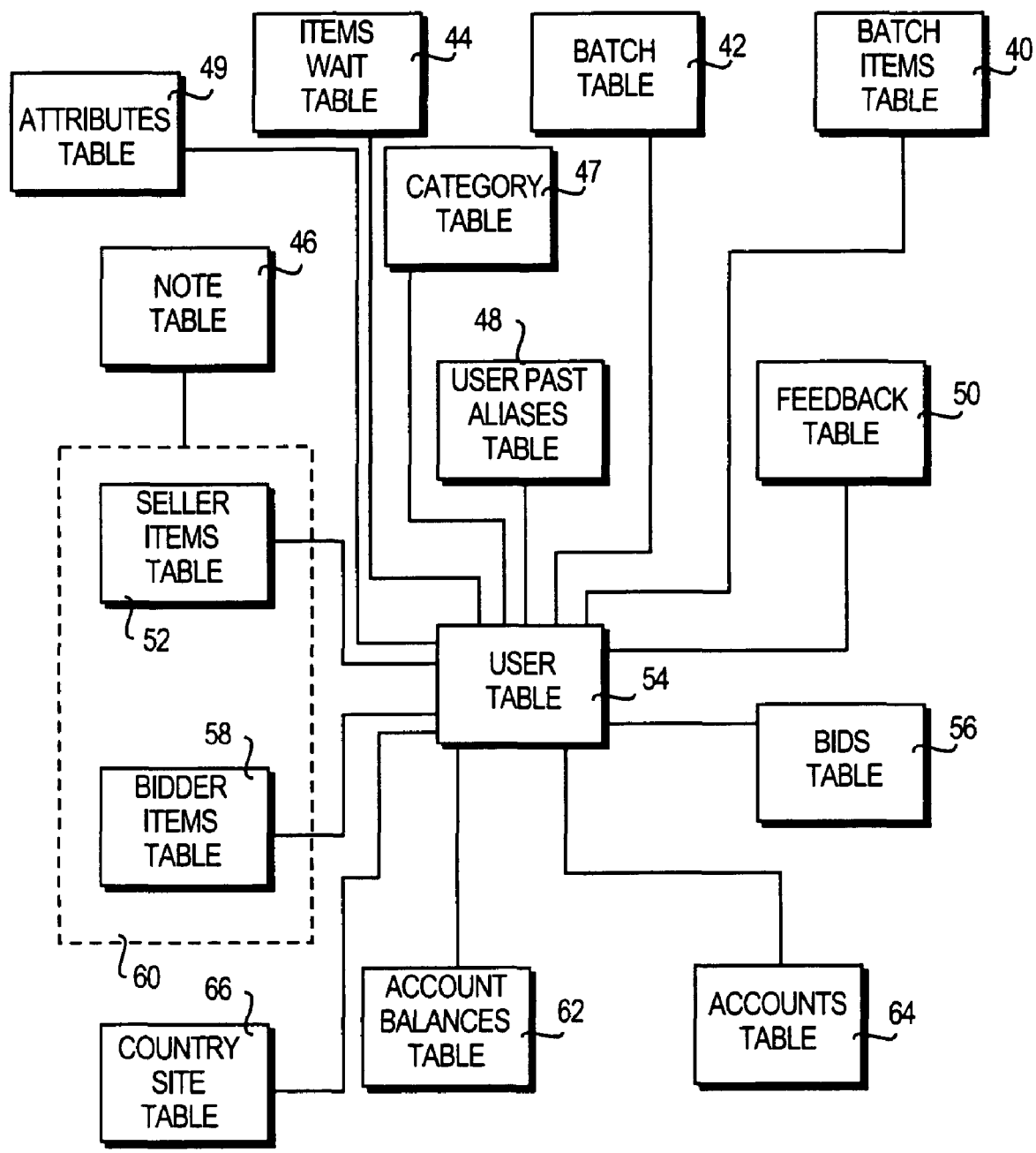
FIG. 2 is a database diagram illustrating an exemplary database for the transaction facility.

FIG. 2 is a database diagram illustrating an exemplary database 30, maintained by and accessed via the database engine server 26, which at least partially implements and supports the network-based commerce system 10.

The database 30 may, in one embodiment, be implemented as a relational database, and includes a number of tables having entries, or records, that are linked by indices and keys. In an alternative embodiment, the database 30 may be implemented as a collection of objects in an object-oriented database. FIG. 2 shows one embodiment of a database, it will be appreciated by those skilled in the art that the invention can be used with other database structures.

Central to the database 30 is a user table 54, which contains a record for each user of the network-based commerce system 10. A user may operate as a seller, buyer, or both, when utilizing the network-based commerce system 10. The database 30 also includes items tables 60 that may be linked to the user table 54. The items tables 60 may include a seller items table 52 and a bidder items table 58. A user record in the user table 54 may be linked to multiple items that are being, or have been, listed or offered for sale via the network-based commerce system 10. A link indicates whether the user is a seller or a bidder (or buyer) with respect to items for which records exist within the items tables 60.

The database 30 also includes one or more category tables 47. Each record within the category table 47 describes a respective category. In one embodiment, a specific category table 47 describes multiple, hierarchical category data structures, and includes multiple category records, each of which describes the context of a particular category within the one of the multiple hierarchical category structures. For example, the category table 47 may describe a number of real, or actual, categories to which item records, within the items tables 60, may be linked.

The database 30 also includes one or more attributes tables 49. Each record within an attributes table 49 describes a respective attribute. In one embodiment, a specific attributes table 49 describes multiple, hierarchical attribute data structures, and includes multiple attribute records, each of which describes the context of a particular attribute within the one of the multiple hierarchical attribute structures. For example, the attributes table 49 may describe a number of real, or actual, attributes to which item records, within the items tables 60, may be linked. Also, the attributes table 49 may describe a number of real, or actual, attributes to which categories, within the category table 47, may be linked.

The database 30 also includes a note table 46 populated with note records that may be linked to one or more item records within the items tables 60 and/or to one or more user records within the user table 54. Each note record within the note table 46 may include, inter alia, a comment, description, history or other information pertaining to an item being offered via the network-based commerce system 10, or to a user of the network-based commerce system 10. Also, the database 30 includes a targeted site table 67 populated with targeted site records that may be linked to one or more item records within the items tables 60 and/or to one or more user records within the user table 54.

A number of other tables are also shown to be linked to the user table 54, namely a user past aliases table 48, a feedback table 50, a bids table 56, an accounts table 64, an account balances table 62 and a batch items table 40.

Figure 3:
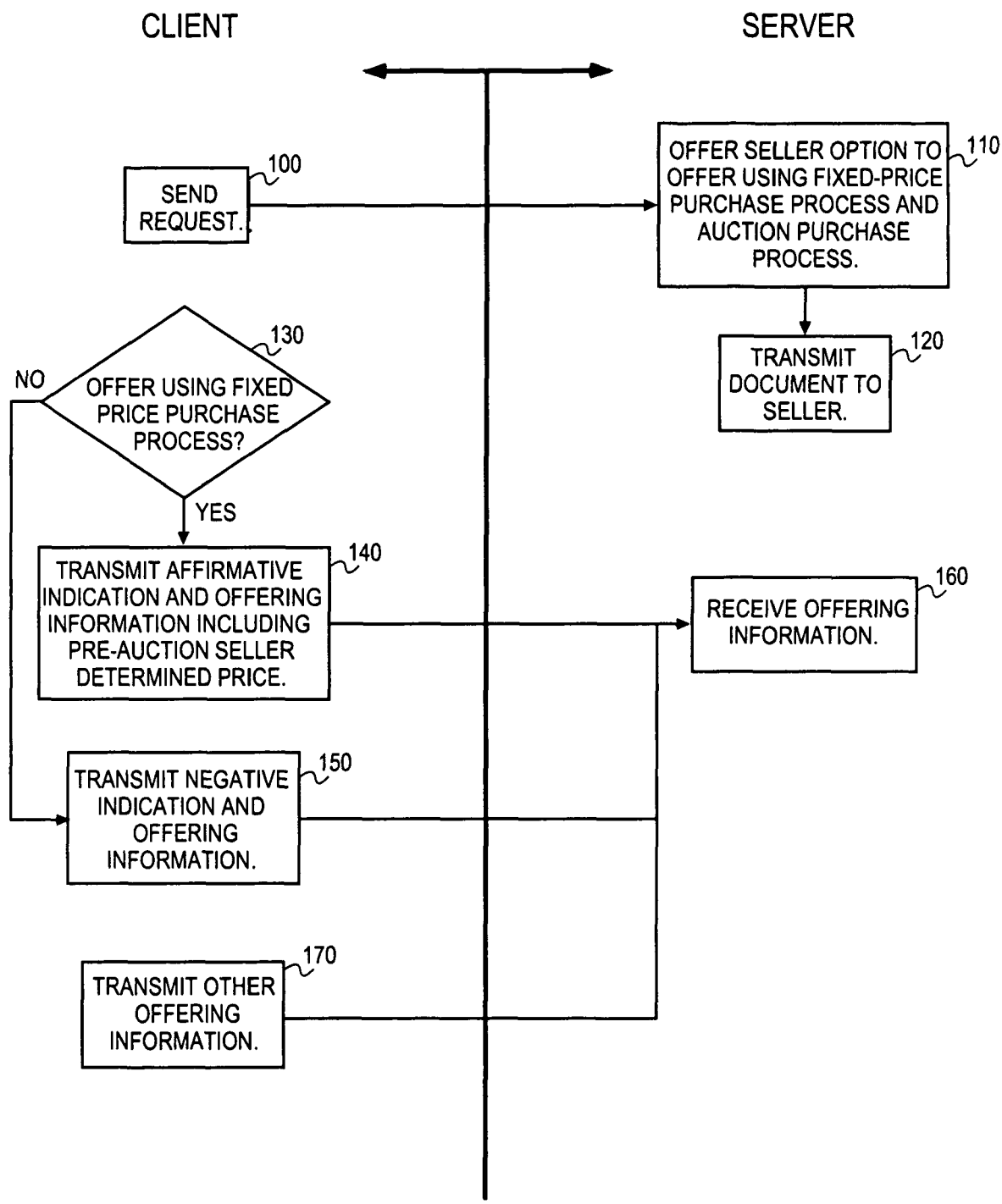
FIG. 3 is a flow chart illustrating an exemplary method of receiving listing information from a seller, indicating whether to offer the item at a seller fixed-price offer.

FIG. 3 shows a flowchart for an exemplary embodiment of a method to acquire listing information from a seller. The seller issues a listing request (block 100) to the commerce system 10, and the commerce system 10 generates instructions (block 110) offering the seller the option to sell his item using an auction price-setting process and/or a fixed price-setting process. After the instructions have been transmitted (block 120), and a page server 12 (see FIG. 1) facilitates the display of the instructions, the seller decides whether to offer a bidder the chance to buy the item utilizing the fixed price-setting process (block 130). In one embodiment, if the bidder options to buy the listed item utilizing the fixed price-setting process, the auction for the listing is automatically closed.

The seller transmits a purchase process indicator by either an affirmative (block 140) or a negative (block 150). The server (commerce system 10) can receive and store in note table 46 of database 30 (FIG. 2) this information for later use (block 160). The seller also transmits other offering information, such as a description, picture, a reserve price, and contact information to be collected and stored in the listings tables 60 of the database 30 (see FIG. 2) (block 170).

Figure 4:
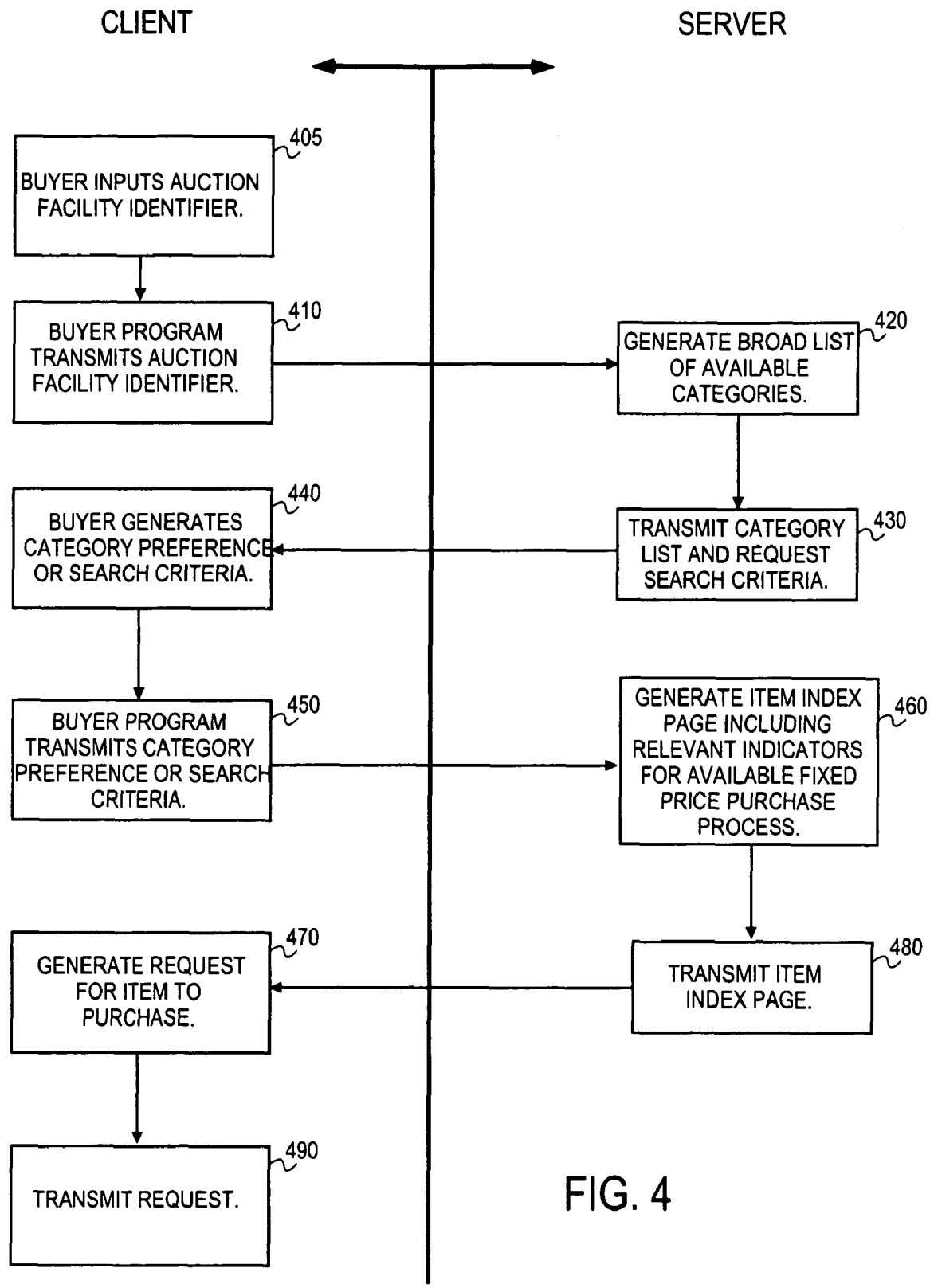
FIG. 4 is a flow chart illustrating an exemplary method of generating a buyer preferred index page using category preferences or search criteria.

FIG. 4 shows a flow chart showing one embodiment of a buyer's interaction with the network-based commerce system 10, which in the exemplary embodiment provides a web site to facilitate user interaction. The buyer locates the web site by inputting the commerce system identifier (e.g., a URL) (block 405) into the client program 36 running on client machine 38 (see FIG. 1) which transmits the commerce system identifier (block 610) through the Internet 34 (See FIG. 1). The network-based commerce system 10 receives the transmission and a listing server 16 (see FIG. 1) generates (block 420) a list of available categories of items stored in items table 60 (see FIG. 2) for buyer selection. The commerce system 10 (block 430) transmits the category list and transmits an interface, generated by page server 12 (see FIG. 1), to allow the buyer to enter search for navigation criteria, which may be the selectable from the category list, or may be independent of the category list (e.g., a text search). The buyer selects a category preference from the category list or generates search criteria (block 440). The buyer then transmits (block 450) the category preference and/or search criteria, again, via the Internet 34 (see FIG. 1). Upon receipt of the category preference and/or search criteria, the commerce system 10 uses a search server 20 (see FIG. 1) to generate an item index page of relevant offerings including visual indicators displayed in respect to items in which the seller is allowing a buyer to buy the item at a seller fixed-price offer, utilizing a fixed price-setting process (block 460). The item index page is transmitted to the buyer (block 480). After receiving the item index page (block 470), the buyer generates a request for an item to purchase or bid on. Picture servers 14 (see FIG. 1) can also be used to show the buyer pictures (if available) of the item. The buyer's request is then transmitted (block 490).

Figure 5A:
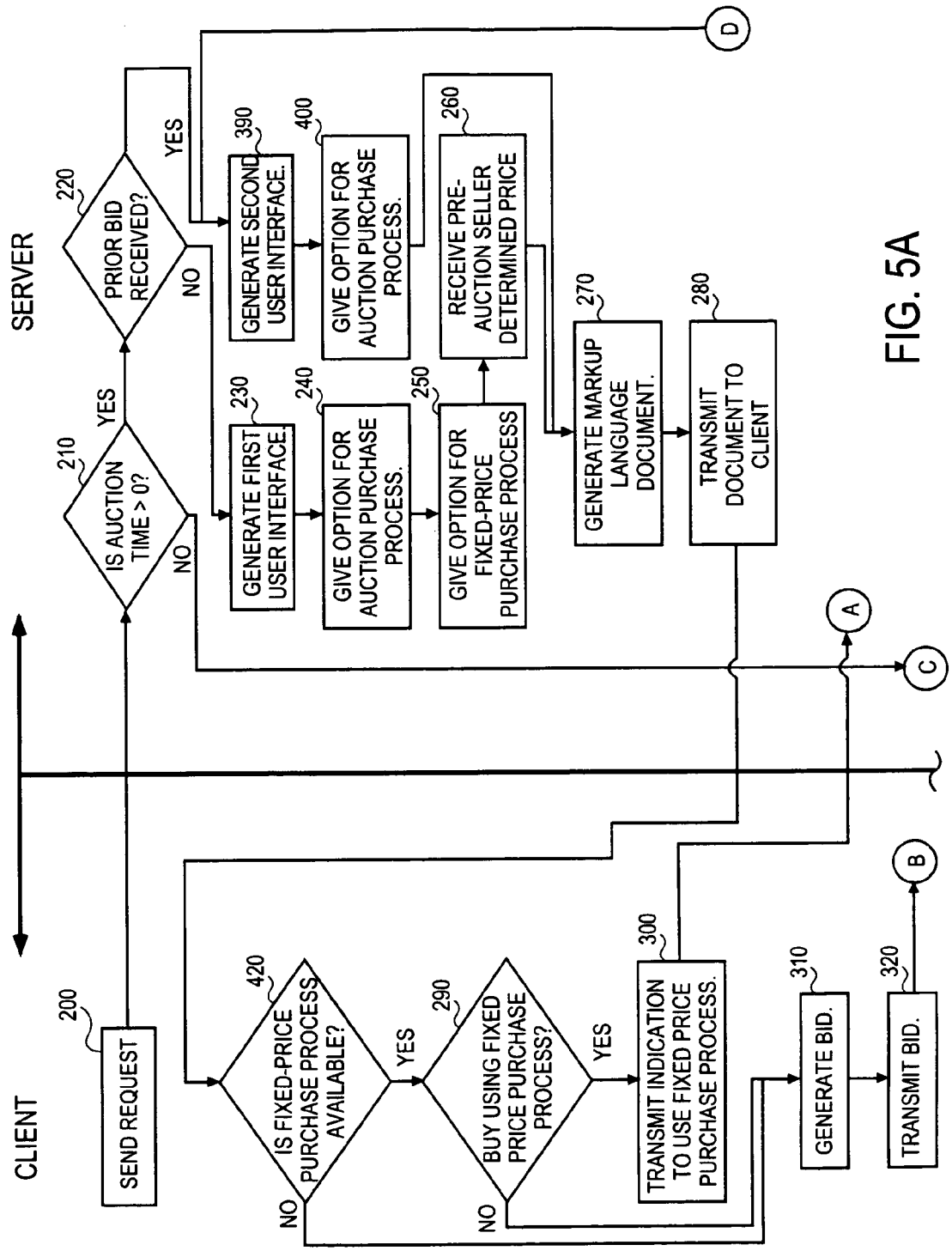
FIG. 5 is a flow chart illustrating an exemplary method of displaying user interfaces for and operating a commerce system with an auction price-setting process and optionally a fixed price-setting process.
Figure 5B:
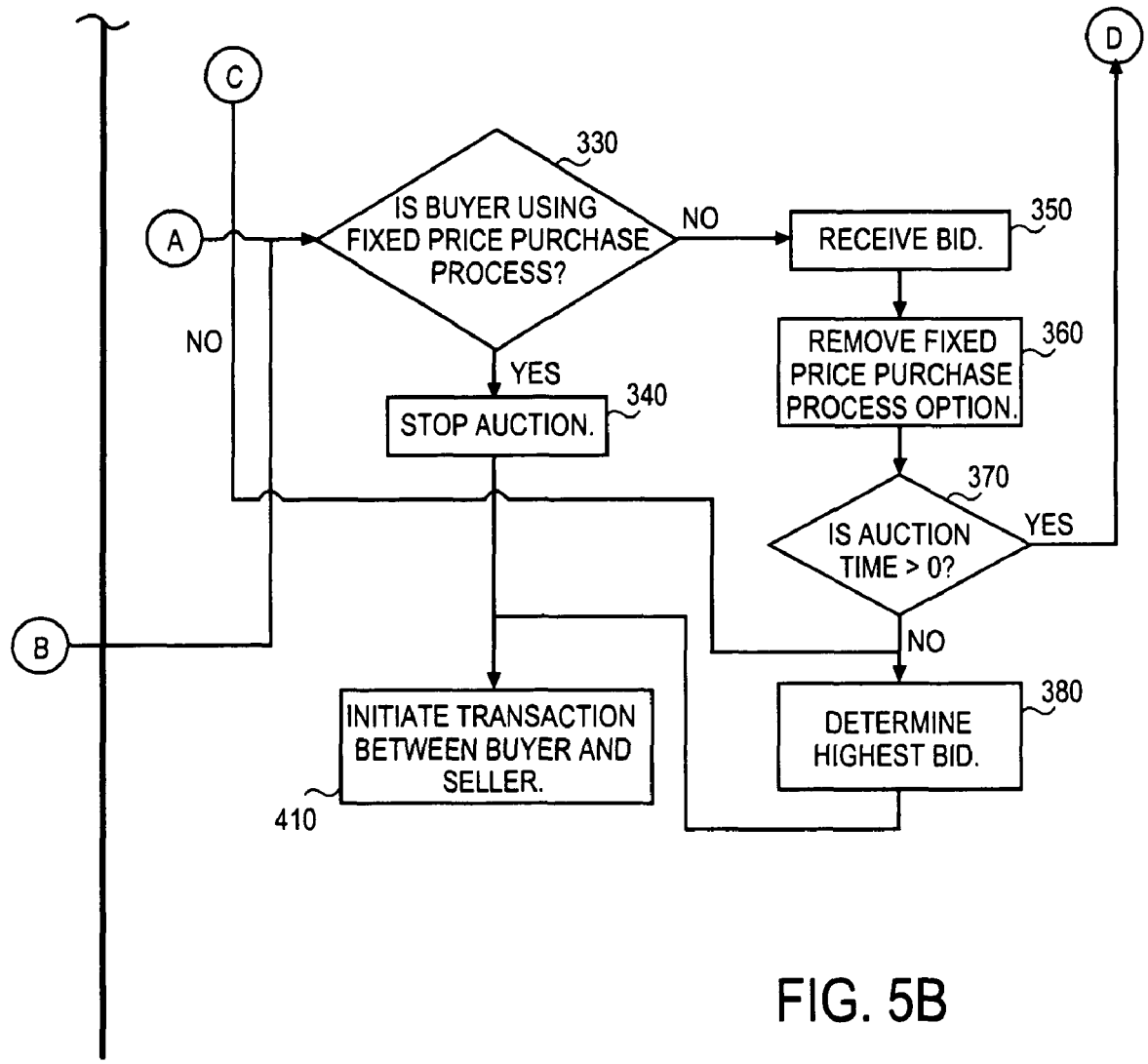

FIGS. 5A and 5B presented a flowchart illustrating an exemplary method by which the buyer interfaces with the network-based commerce system 10, when a seller fixed-price offer is an alternative option to bidding. After the commerce system 10 receives the bidder's request (block 200) from the client machine 38, decision block 210 decides if there is still time remaining in an auction price-setting process for the relevant item (item requested by the bidder). Specifically, the auction price-setting process may be time limited. In this embodiment, if a predetermined period of time has passed, the buyer will not be allowed to buy at the seller fixed-price offer. Instead the auction price-setting process will end and the highest bidder (if there is one) will be determined (block 380). However, in alternative embodiments, the buyer is allowed to buy at the seller fixed-price offer after a predetermined period of time has passed, as will be described below in conjunction with FIG. 6. If there is time remaining, a determination is made in decision block 220 whether a prior bid has been received. In this embodiment, if a prior bid has been received, then the seller fixed-price offer is no longer available to the buyer and the buyer's only option is to bid and a second user interface will be generated (block 390). If no prior bid has been received, and the item has a seller fixed-price offer available, a first user interface will be generated (block 230). The commerce system 10 will make the typical auction price-setting process available through the first user interface (block 240) and will make the fixed price-setting process available to the client through the first user interface (block 250). The seller fixed-price offer is retrieved for the first user interface (block 260). The first user interface is generated as a markup language document suitable for viewing by the buyer (block 270). The generated markup language document is then transmitted for viewing by the buyer on the client machine 38 using pages servers 12 on the network-based commerce system 10 (block 280).

Referring again to decision block 220, if it is determined that an initial bid value has been received, a second user interface will be generated (block 390). The auction price-setting process is then invoked, and made available through the second user interface (block 400). The second user interface is generated as a markup language document suitable for viewing by the buyer (block 270). The generated markup language document is then transmitted to the buyer (block 280).

After the markup language document has been transmitted to the buyer, a determination is made at decision block 420, based on the transmitted markup language document, whether the fixed price-setting process is available to the buyer. If the fixed price-setting process is available to the buyer, the buyer then makes a determination at decision block 290 whether to buy the item utilizing the fixed price-setting process (e.g., at the seller fixed-price bronze offer) or utilizing the auction price-setting process (e.g., whether to bid on the item). If the buyer chooses to purchase the item using the fixed price-setting process, an indication to this end is transmitted to the commerce system 10.

If the fixed price-setting process is not available to the buyer (as determined in decision block 420) or fixed price-setting process is available, but the buyer chooses not to use the list option, the buyer provides a bid (block 310). The bid is then transmitted to the commerce system 10 (block 320).

Upon receiving a transmission at the network-based commerce system 10, from the buyer, a determination is made at decision block 330 whether the buyer has chosen the fixed price-setting process. If the buyer has chosen the fixed price-setting process, the auction price-setting process is stopped (block 340) and a transaction is established between the buyer and the seller (block 410). Optionally, the commerce system 10 can check the buyer's credit before stopping the auction.

If the buyer has not opted to use the fixed price-setting process, as determined by the commerce system 10 at decision block 330 (either because it wasn't available or he or she preferred to place a bid instead), the bid is received (block 350). Optionally, if the bid is greater than the seller fixed-price offer (and the fixed price-setting process is still available), the commerce system 10 may invite the buyer to use the fixed price-setting process. In one embodiment, upon receipt of the bid, the fixed price-setting process option is removed (block 360) and a determination is made at decision block 370 to see if there is any time remaining in the auction price-setting process. If there is time remaining, bids can be received and processed until expiration of the auction price-setting process. However, if there is no more time remaining in the auction price-setting process, the highest valid bid is determined from the received bids (block 380), and a transaction is established between the highest bidder and the seller (block 410).

Figure 6A:
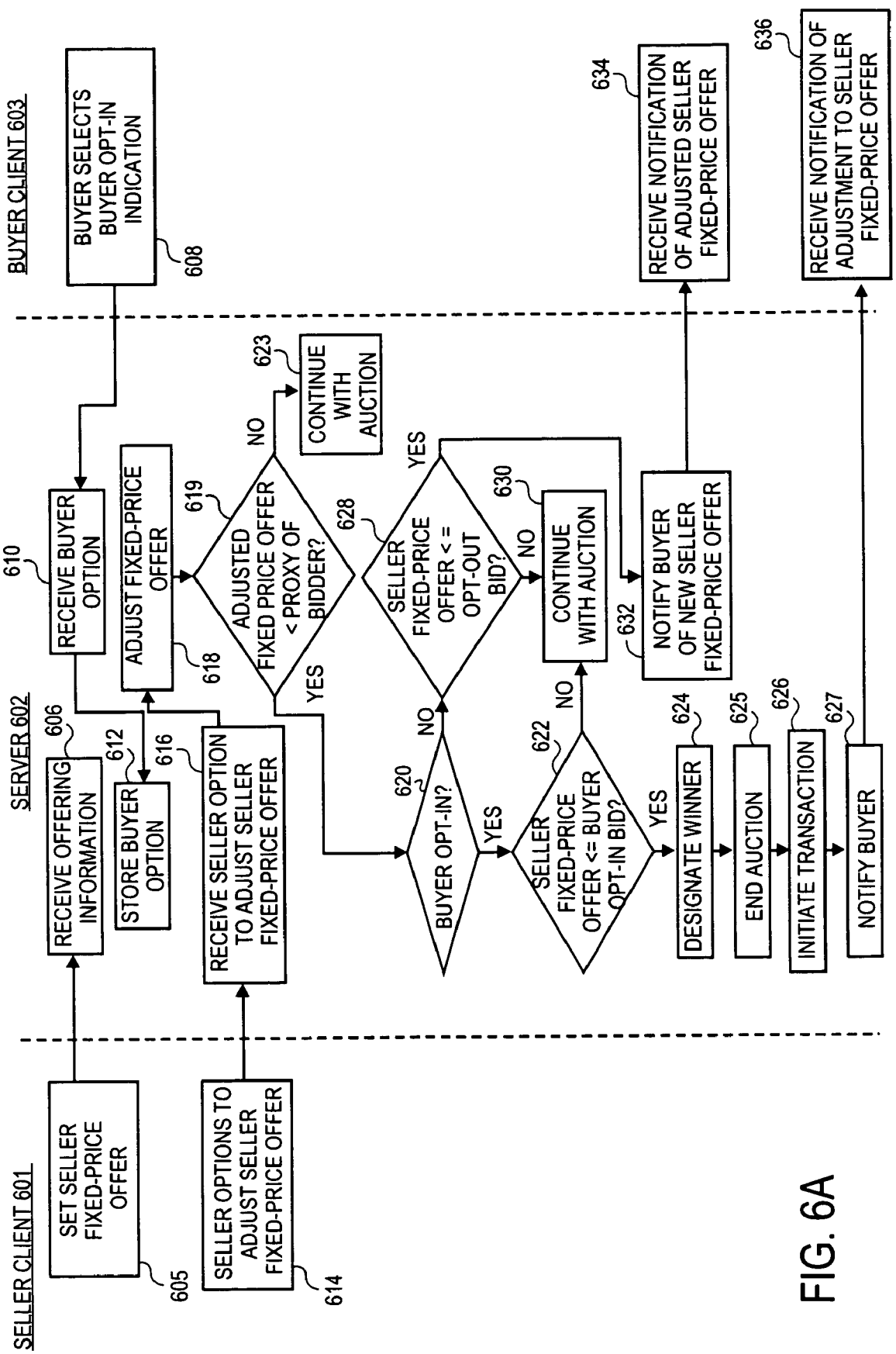
FIG. 6A is a flow chart depicting a method, according to an exemplary embodiment of the present invention, to adjust a seller fix-price offer in an auction.

FIG. 6A is a flow diagram illustrating an exemplary method to just a seller fixed-price offer, provided within the context of a concurrent auction price-setting process, where the option remains for the buyer to purchase a listed item at the commerce system 10 for the seller fixed-price of a during the auction price-setting process, even after bids have been submitted. However, the fixed price-setting process option may disappear if submitted bids surpass either the reserve price or the fixed-price offer.

A seller client side 601, a buyer client side 603, and a server side 602 separate FIG. 6A. At block 605, within the seller client side 601, a seller may provide an indication to adjust a seller fixed-price offer for a listing when generating offer information. For example, a seller may decide to adjust a seller fixed-price offer of a listing after determining that the current seller fixed-price offer is higher than a buyer is willing to play and/or higher than a market price for the item.

At block 606, the commerce system 10 receives the listing information, including the indication that a reserve price and/or seller fixed price offer of the listing may be adjusted during the auction price-setting process. One exemplary embodiment of a method to receive and process listing information from a seller at the commerce system 10 is illustrated in FIG. 3. The listing information, including reserve price and/or fixed-price offer price information, may be collected and stored in the seller items table 52 of database 30.

At block 608, a buyer selects a buyer opt-in indication to opt into a binding agreement if the seller fixed-price offer is adjusted at or below a submitted bid of the buyer during the auction price-setting process. That is, when a buyer places a bid on an item, the buyer will be given the option (e.g., via a bid confirmation page) to make the bid an opt-in bid or an opt-out bid. In one embodiment, if the buyer does nothing, the bid defaults to being an opt-out bid, as will be described.

If a buyer opts-in, the buyer agrees that the placed bid is binding regardless of whether an adjustment made to the reserve price or seller fixed-price offer of an item during the auction price-setting process. If a buyer has opted out, this indicates the buyer's desire that a placed bid not be binding in the event that an adjustment is made to the reserve price or the seller fixed-price offer. It should be understood that the buyer may submit a proxy bid for the item, in which case the commerce system 10 will submit a bid (e.g., based on a predetermined increment) on the behalf of a buyer up to a maximum bid price set by the buyer.

At block 610, the network-based commerce system 10 receives the buyer bid option, including an opt-in or opt-out bid preference. The bid option information may be stored in the user table 54 of database 30 (at block 612).

At block 614, the seller transmits an option to adjust the predefined seller fixed-price offer of a listing for an item during an auction price-setting process.

At block 616, the commerce system 10 receives the option to adjust the seller fixed-price offer. At block 618, the commerce system 10 adjusts the seller fixed-price offer based on the indication given by the seller in block 614.

At block 619, the commerce system 10 determined whether the adjusted fixed-price offer is less then the proxy of the bidder. If the seller fixed-price offer is lowered, but is still above the bidder's proxy bid, control passes to block 623. If the seller fixed-price offer is lowered and is less then the bidder's proxy, control passes to block 620.

At block 623, no action will be taken and the auction will continue. The bids will stand, and the auction price-setting process will still show the reserve price has not been met.

At block 620, a determination is made whether a buyer has submitted an opt-in bid. If an opt-in bid has been submitted, control passes to block 622. If an opt-out bid has been submitted, control passes to block 628. At block 622, if the seller lowers the seller fixed-price offer to at or below the opt-in bidder's proxy bid, the high bidder will then automatically become the winner of the item and the agreement is binding (block 624). At block 625, the commerce system 10, via a page server 12, will show the auction price-setting process has ended for the item with the seller fixed-price offer. At block 626, a transaction is established between the buyer and seller.

At block 627, the buyer is notified of being a winner of the listing. Notification may be performed via an email mechanism, instant messaging, peer-to-peer communications, update of the listing, or other well known electronic or non-electronic communications mechanisms well known to those of ordinary skill in the art.

If the seller fixed-price offer is lowered (block 618), but is still higher than the opt-in bidder's high bid (block 622), the auction price-setting process will continue (block 630).

At block 620, if a buyer has opted out, the proxy bid of the buyer is not binding if the price is lowered. At block 628, if the seller lowers the seller fixed-price offer below the opt-out bidder's proxy bid, the commerce system 10 will transmit a notification of the adjustment to the buyer(s) (and/or other relevant parties) that have established proxy bids at or greater than the adjusted seller fixed-price offer.

The relevant parties may include all of the buyers that have submitted a bid for the item and/or watchers (e.g., individuals that are have indicated an interest in the auction but may have not submit a bid). The relevant parties may also include parties that are given special consideration during the auction for a variety of reasons.

If the seller lowers the seller fixed-price offer to a price that is still greater than a buyer proxy bid, no special messaging is given to the high bidder and the auction price-setting process continues as normal, at block 630.

At block 634, the buyer (and/or relevant parties) receives notifications of the adjustment of the reserve price and/or fixed-price offer. Notification may be performed via a email mechanism, instant messaging, peer-to-peer communications, update of listing, or other well known electronic or non-electronic communications mechanisms well known to those of ordinary skill in the art.

At block 636, the buyer receives notification of being a winner of the offering.

It should be understood that the seller fixed-price offer for the listing may initially be set before or during the auction for the item. It should also be understood that the seller fixed-price offer will be available on the listing until the item is purchased or the auction for the listing ends. The seller may further, during an auction, invoke and activate the seller fix-price offer feature, as discussed above. Also, the fixed price-setting process option may be disabled if submitted bids surpass either the reserve price or the fixed-price offer, as discussed above in conjunction with FIG. 5. It should be understood that the seller may adjust the reserve price and/or the seller fixed-price offer as often as wanted.

It should be appreciated that the process flow of FIG. 6A may be used when the seller options to adjust the reserve price. However, instead of designating a winner (at block 624), ending the auction (at block 625), and initiating a transaction (at block 626), the commerce system 10 may inform the bidders that the reserve has been met. Furthermore, if the seller fixed-price offer is lowered below the reserve price, the reserve price will also be automatically lowered to the same amount as the seller fixed-price offer.

Figure 6B:
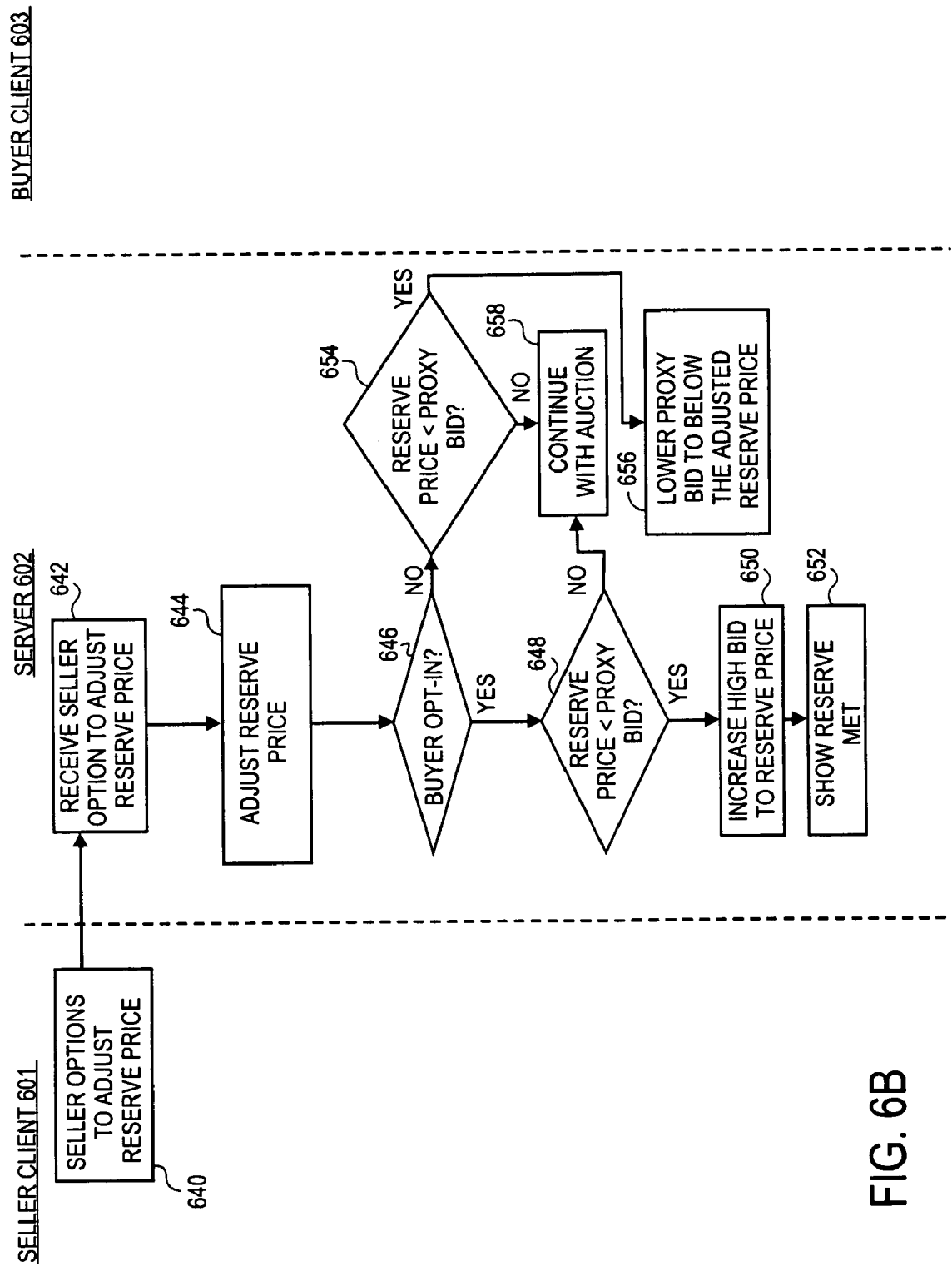
FIG. 6B is a flow chart depicting a method, according to an exemplary embodiment of the present invention, to adjust a reserve price in an auction.

FIG. 6B is a flowchart illustrating a method, according to one embodiment of the present invention, to adjust a reserve price in an auction. Operations on a seller client side 601, a buyer client side 603, and a server side 602 are distinguished in FIG. 6B. At block 640, a seller adjust a reserve price for a listing. At block 642, the seller receives the seller's adjustment of the reserve price for the listing. At block 644, the reserve price is adjusted at the commerce system 10.

At block 646, if the buyer has submitted an opted-in bid, (as in block 608), control passes to block 648. At block 646, if the buyer has submitted an opt-out bid, control passes to block 654. At block 648, if the reserve price is lowered below a maximum proxy bid submitted by the buyer, at block 644, control passes to block 650. At block 650, the buyer will remain the current high bidder, but the high bid will be raised to the adjusted reserve price, and the reserve will be noted as met at block 652. The auction price-setting process is now binding. At block 648, if the reserve price is lowered, but is still above the opt-in bidder's proxy. The commerce system 10 will still show the reserve price is not yet met and the auction price-setting process will continue at block 658.

At block 654, if it is determined that the seller has lowered the reserve price below the proxy of the opt-out buyer, control passes to block 656. At block 656, the proxy bid will be lowered to below the adjusted reserve price. For example, the proxy bid will be lowered to one dollar below the lowered reserve price. In one embodiment, in addition to the email that will be sent to all bidders when the reserve has been lowered, there may also be messaging that will explain that the proxy bid has been changed. There may also be a capability to receive more detailed information (e.g., a link to a WWW page generated by the page server 12, that gives more detailed information to the bidder).

If the reserve price is lowered, but is still above the opt-out bidder's proxy, at block 654 control passes to block 658. At block 658, the auction price-setting process will continue, the bids will stand, and the commerce system 10 will still show reserve not met.

It should also be understood that the reserve price may be removed or disabled from a listing. In this fashion, the auction facility 10 will notify the parties that the reserve price has been met automatically or upon receiving the next bid for the item. This would mean, for example, that the current high bidder would be bound to purchase the listed item at the current high bid price or the reserve price is automatically adjusted to be a specific amount (e.g., $1) above the current high bid (and the next bid that is placed will meet the reserve price). It should also be understood that in one embodiment, the reserve price and/or seller fixed-price offer may also be increased. The reserve price and/or seller fixed-price offer for the listing may initially be set before or during the auction price-setting process for the item. Further, the seller fix-price offer may be available on the listing until the item is purchased or the auction price-setting process for the listing ends. Also, the bidders may be notified (e.g., via email, instant messenger, update of listing, etc) of any change in reserve price (at block 644), high bid (at block 650), and proxy bid (at block 656). It should be understood that the seller may adjust the reserve price and/or the seller fixed-price offer as often as wanted.

Figure 6C:
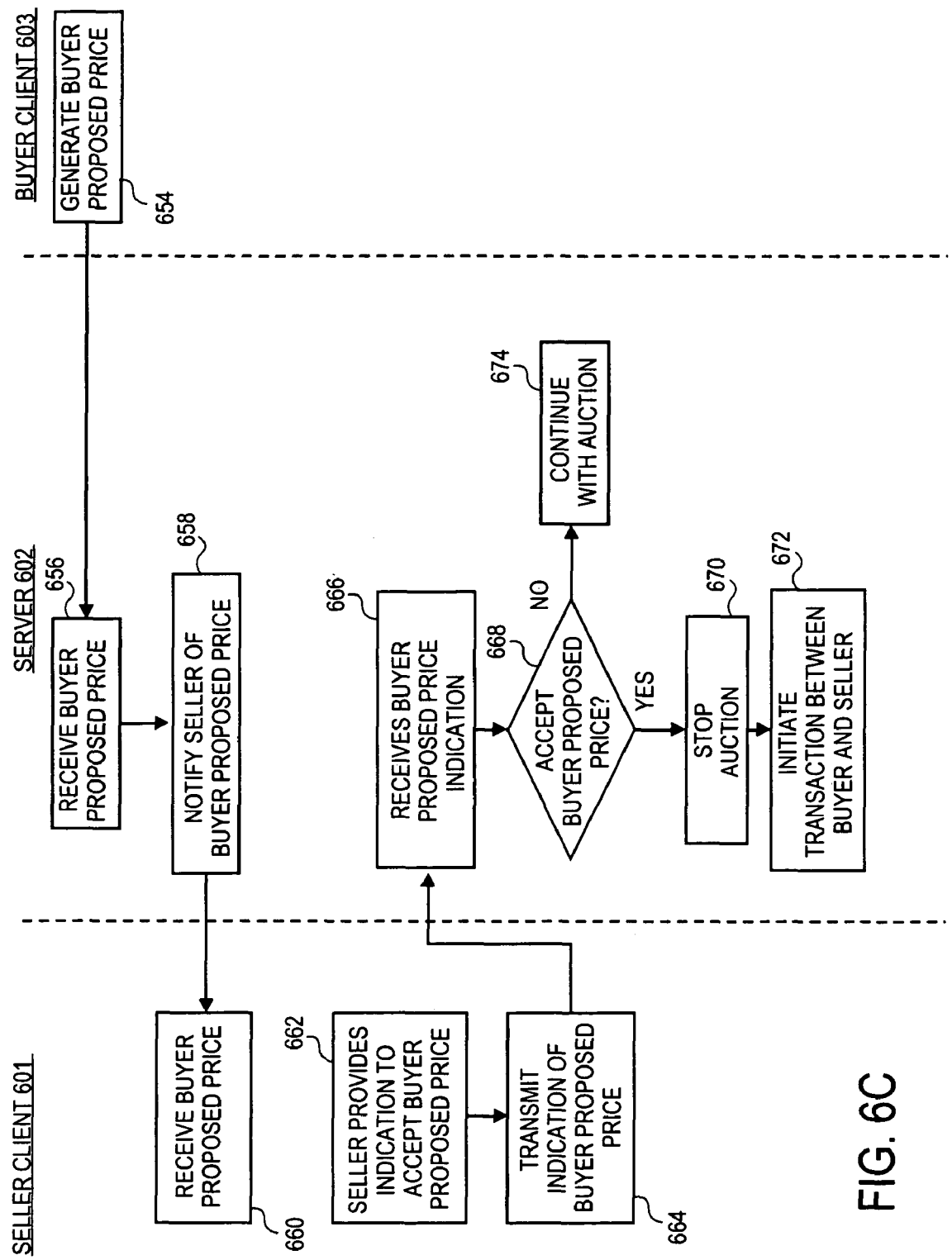
FIG. 6C depicts a flow chart illustrating a method, according to an exemplary embodiment of the present invention, to facilitate buyer proposal of an offer price.

FIG. 6C is a flowchart illustrating a method, according to one embodiment of the present invention, to receive buyer proposed offer price. According to this method, a buyer may indicate a desire to a seller to purchase a listed item from the seller at a buyer-proposed offer price, thereby negotiating with the seller to buy the item. Operations at a seller client side 601, a buyer client side 603, and a server side 602 are shown in FIG. 6C.

At block 654, a buyer generates a buyer-proposed price for an offered item listed on the commerce system 10. The buyer-proposed offer price may be the price the buyer is willing to pay for the listed item, and the seller may accept or reject.

At block 656, the commerce system 10 receives the buyer-proposed offer price for the listing. At block 658, the commerce system 10 notifies the seller of the buyer-proposed offer price (e.g., via email, instant messaging, and update of listing, among other well known mechanisms).

At block 660, the seller receives the notification of the buyer-proposed offer price. At decision block 662, the seller declines or accepts the buyer-proposed offer price as an agreed-upon price of the item. At block 664, the seller transmits the indication of the acceptance or the declining of the buyer-proposed offer price to the network-based commerce system 10.

At block 666, the network-based commerce system 10, receives the indication of the seller's acceptance or declining of the buyer-proposed price as an agreed-upon price. At block 668, if the seller accepts the buyer-proposed price, control passes to block 670. At block 668, if the seller declines the buyer-proposed price, control passes to block 674 and the auction continues. At block 670, the auction price-setting process is stopped. At block 672, a transaction obligations are established between the buyer and the seller. It should also be understood that although the seller may not accept the buyer-proposed offer price, the seller may, in the alternative, adjust the reserve price and/or seller fixed-price offer of the listing of the item, as described above. In this way, the buyer and seller may negotiate to reach a mutually agreed to sale price.

Figure 6D:
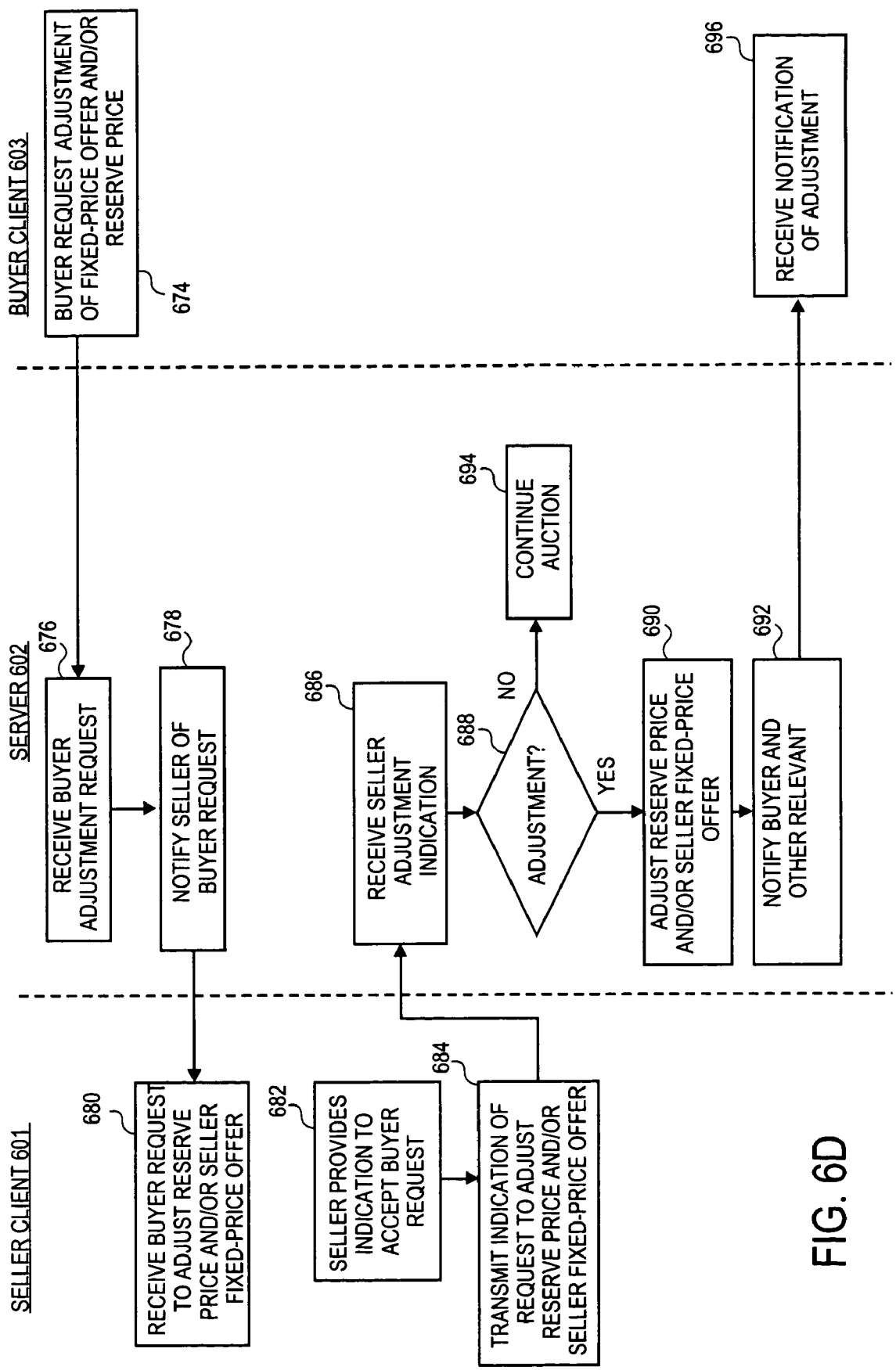

FIG. 6D is a flowchart illustrating a method, according to an exemplary embodiment of the present invention, to adjust a reserve price and/or seller fixed-price offer for a listing, based on a buyer request. At block 674, the buyer generates a request for the seller to adjust the predefined seller fixed-price offer of the listing and/or the reserve price of the listing. In this way, the buyer attempts to negotiate with the seller to lower the reserve price and/or fixed-price during an auction price-setting process, lest, for example, the auction price-setting process terminates without a winner.

At block 676, the network-based commerce system 10 receives the buyer request to adjust the reserve price and/or seller fixed-price offer. At block 678, the network-based commerce system 10 notifies the seller of the request to adjust the seller fixed-price offer and/or reserve price (e.g., via email, instant messaging, among other notification mechanisms).

At block 680, the seller receives the buyer's request to adjust the seller fixed-price offer and/or reserve price. At block 682, the seller indicates whether to adjust the fixed-price offer and/or reserve price. At block 684, the buyer transmits the indication to adjust the reserve price and/or seller fixed-price offer proposed by the buyer.

At block 686, the network-based commerce system 10 receives the indication to adjust the reserve price and/or seller fixed-price offer. At block 688, if the indication is to accept the buyer-proposed adjustment, control passes to block 690. If the indication is not to accept the buyer-proposed adjustment, control passes to block 694. At block 694, the buyer (and any other relevant party) are notified of the rejection and the auction continues.

At block 690, the network-based commerce system 10 adjusts the reserve price and/or seller fixed-price offer based on the buyer adjustment request. The adjustment of the reserve price and/or seller fixed-price offer may be published to the client machine 38 using page server 12 an commerce system 10.

At block 692, the buyer is notified of the adjustment of the seller fixed-price offer and/or reserve price. In one embodiment, any additional relevant party may also be notified of the adjustment of the seller fixed-price offer and/or reserve price. The notification may be via email, instant messaging, etc.

At block 696, the buyer receives the notification of the adjustment of the seller fixed-price offer and/or reserve price (e.g., via email, instant messaging, among other examples)

Figure 7A:
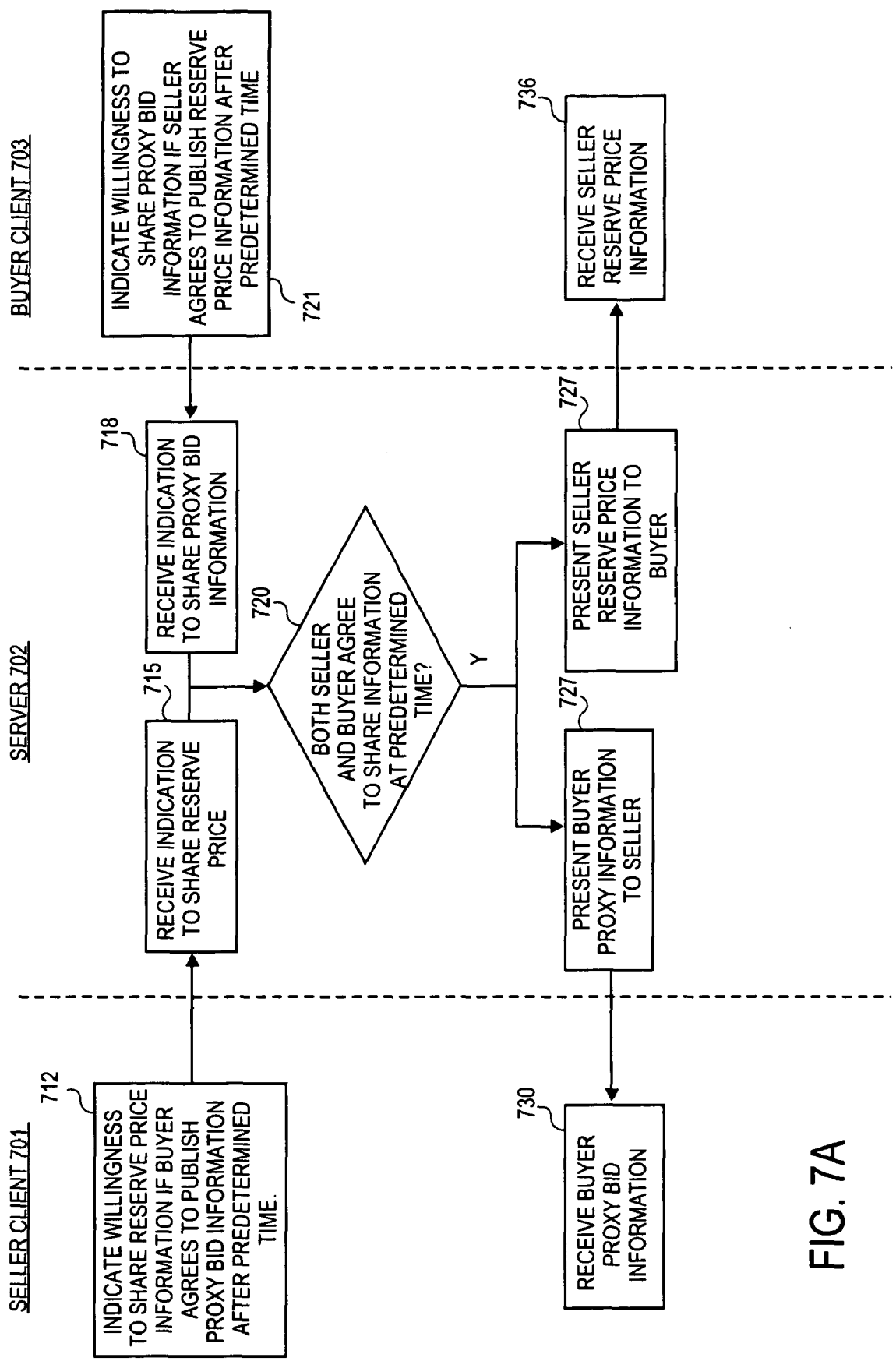
FIG. 7A is a flow chart illustrating a method, according to an exemplary embodiment of the present invention, to exchange reserve price information of a seller and proxy bid information of a buyer.

FIG. 7A is a flowchart illustrating a method, according to an exemplary embodiment of the present invention, to facilitate exchanging reserve price information of a seller and proxy bid information of a buyer. The process flow of FIG. 7A is separated into a seller client side 701, a buyer client side 703, and a server side 702. This process flow allows a buyer and seller to agree to exchange proxy and reserve price information with a view to promoting establishment of a mutually agreed to price for the item. In one embodiment, this process flow may be initiated upon the server 702 inviting a seller and/or a buyer to exchange proxy bid information and reserve price information. These invitation may be provided on the listings to the related items before or during the auction price-setting process.

At block 712, the seller indicates a willingness to exchange reserve price information related to a listing if the buyer agrees to provide proxy bid information. This indication is sent to the commerce system 10.

At block 715, the network-based commerce system 10 receives an indication that the seller is willing to exchange the reserve price information of a listing if the buyer is willing to agree to provide proxy bid information.

At block 721, a buyer indicates a willingness to exchange proxy bid information related to the listing if the seller agrees to provide the current reserve price of the listing for the item. This indication is sent to the commerce system 10.

At block 718, the network-based commerce system 10 receives an indication that the buyer is willing to exchange the proxy bid information of a listing if the buyer is willing to agree to provide reserve price information.

At block 720, a determination is made at the commerce system 10 whether both the seller and the buyer agree to exchange the reserve price information and proxy bid information, respectively. Following a positive determination at block 720, the reserve price information is sent to the seller and the proxy bid information is sent to the buyer at block 727.

At block 730, the seller receives the buyer proxy bid information.

At block 736, the buyer receives the seller reserve price information.

This exchange seller and buyer information could occur during or after an auction. In one embodiment, upon conclusion of an auction, a notification (e.g., email, etc.) is sent to the seller and/or buyer inviting them to exchange reserve price and/or proxy bid information to the other party. In one embodiment, a notification could be triggered when the proxy and reserve prices are within an predetermined proximity (e.g., a 20% proximity) to each other. Further, these exchanges could be maintained as private communications between a particular buyer and a seller. Alternatively, an exchange offer could be indicated in the listing, either during or after the auction. It should be noted that this concept is mutually exclusive with the publication of the proxy and reserve prices during an auction.

It should be understood that the commerce system 10 may allow the seller and/or buyer to communicate their desire to exchange information directly to the other party. The receiving party may then reply with an indication whether to accept the invitation to exchange information or not.

In one embodiment, the auction facility 10 automatically displays the proxy bid (e.g., the maximum amount a buyer is willing to bid to purchase an item on a listing) while the proxy bid amount is less than a reserve price.

In one embodiment, the seller would be able to communicate different prices (e.g., reserve or seller fix-price offer) to different sellers, depending upon various conditions. For example, where the buyer had an excellent reputation, or utilized a specific payment service (e.g., PayPal), the seller may wish to offer a discounted price. Further, other factors such as shipping etc. could be built into the price, in which case the seller could communicate different prices based on buyer location. Essentially, this mechanism would allow the seller to engage in multiple parallel negotiations with individual buyers and different conditions possibly applying to each buyer. This mechanism could provide a "second phase" in the negotiation process whereby, following establishment of a base price at the close of an auction or fixed-price-setting process, the buyer and seller could engage in separate negotiations regarding the shipping or other charges.

Figure 7B:
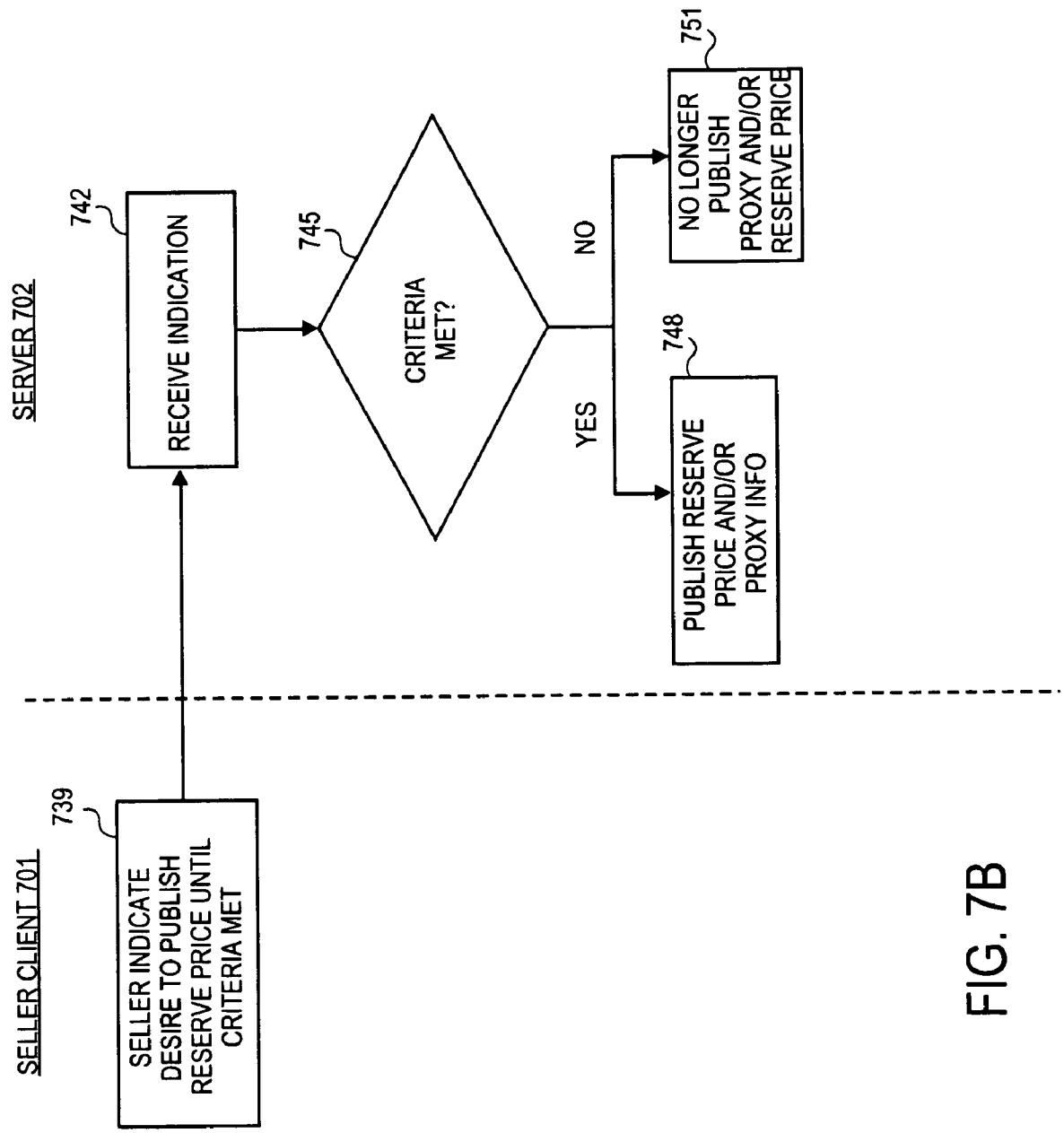
FIG. 7B is a flow chart illustrating a method, according to an exemplary embodiment of the present invention, to publish reserve price information based on predetermined criteria.

FIG. 7B is a flowchart illustrating a method, according to one exemplary embodiment of the present invention, to facilitate publishing reserve price information based on criteria. The process flow of FIG. 7B is separated into a seller client side 701 and a server side 702.

At block 739, a seller indicates a willingness to publish a reserve price listing of an item that is otherwise hidden from the buyers on the commerce system 10, upon completion of certain criteria. This concept is motivated by the understanding that, in a below-reserve situation, buyers are not bidding against other buyers but in fact bidding against the reserve price. It should be understood that when the high proxy bid exceeds the reserve price, the proxy bid information is no longer published so as to allow buyer to compete against each other with the required anonymity. In one embodiment, the auction may be limited in certain commerce categories (e.g., high value categories), or that could otherwise be optional enabled/disabled by a seller.

At block 742, the commerce system 10 receives an indication to publish the reserve price upon the completion of the given criteria. At block 745, a determination is made whether the criteria have been met. The criteria may be, for example, to publish either or both of the proxy and reserve prices if the high proxy bid is less than the reserve price. If the criteria have been met, control passes to block 748. At block 748, the commerce system 10 publishes the reserve price and/or proxy bid information for the item. If the criteria have not been met, control passes to block 751. At block 751, the commerce system 10 removes or retract the reserve price and/or proxy bid information from publication via a page server 12.

It should be understood that the bidder may be notified (e.g., via email, instant messenger, update of listing, etc) of the publication of the reserve price and/or proxy (at block 748) or the removal of publication (at block 751).

It should also be understood that the commerce system 10 may publish the proxy bid without receiving an indication from the seller. In this fashion, the commerce system 10 publishes the proxy bid (e.g., the maximum amount the buyer is willing to pay for an item) regardless of the seller's desire.

Figure 7C:
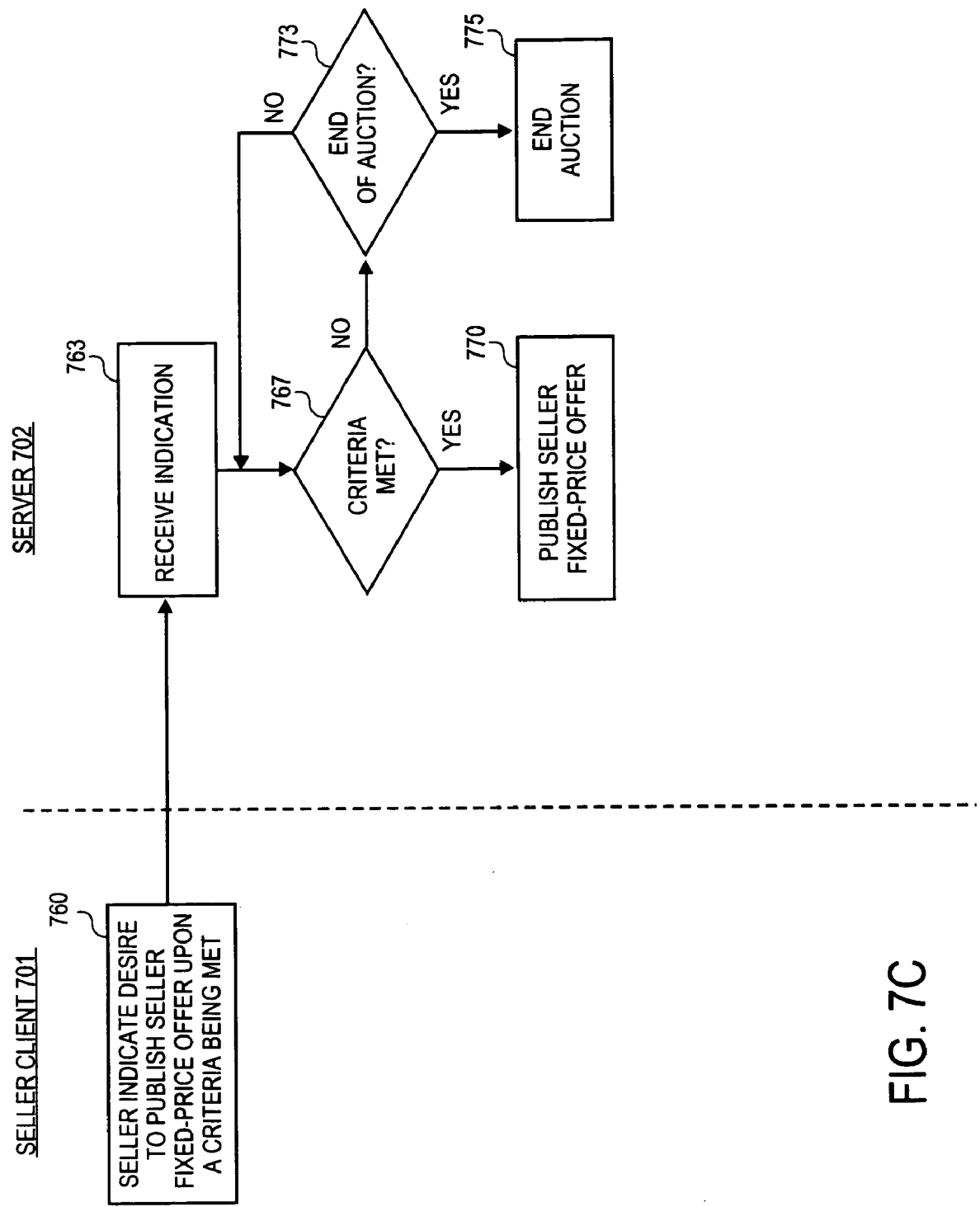
FIG. 7C is a flow chart illustrating a method, according to an exemplary embodiment of the present invention, to publish a fixed-price offer during an auction price-setting process.

FIG. 7C is a flowchart illustrating a method, according to the exemplary embodiment of the present invention, to publish a fixed-price offer during an auction. The process flow of FIG. 7C is separated into a seller client side 701 and a server side 702.

At block 760, the seller indicates a desire to publish a predefined fixed-price offer for an item listed for auction when a specific criterion has been met. The seller fixed-price offer may be made available, or alternatively the seller fixed-price offer may be published, once the actual or proxy bids have reached a certain value. Accordingly, the seller fix-price offer is not published until this point. Again, notification would be utilized to advise buyers or watchers that the seller fix-price offer auction had been activated, or that the seller fix-price offer had been published. For example, the specific criteria may be not to display the seller fixed-price offer until a specific time has lapse on the auction.

At block 763, the commerce system 10 receives the indication from the buyer not to display the fixed-price offer until the criteria has been met. At block 767, a determination is made whether the criteria has been met. If the criteria has been met, then control passes to block 770. If the criteria is not met, control passes to block 733. At block 770, the commerce system 10 publishes the fixed-price offer related of the listing describing an item during auctioned.

At block 773, a determination is made whether the auction has ended. If the auction has not ended, control passes returns to block 767. If the auction has ended, control passes to block 775.

Figure 8:
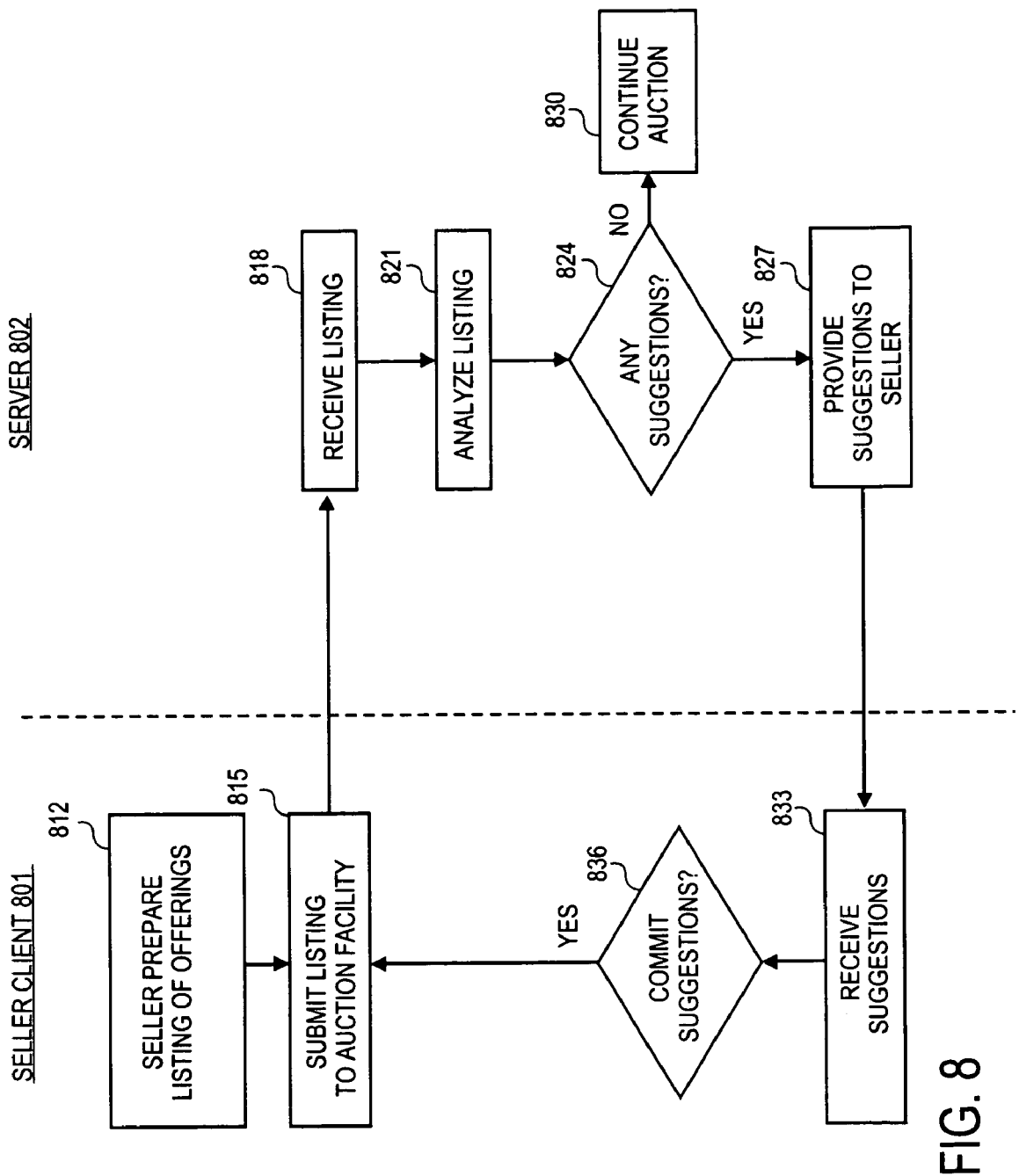
FIG. 8 is a flow chart illustrating a method, according to an exemplary embodiment of the present invention, for the operation of a listing analyzer.

FIG. 8 illustrates a process flow of one embodiment of a list analyzer. The processes are separated into the processes of a seller client side 801, a buyer client side 803, and a server side 802. The list analyzer process reviews a listing of an offering submitted by a seller and makes suggestions to how the listing may be improved to increase the likelihood of a sale resulting.

At block 812, a seller prepares a listing of offering at the client machine 38. At block 815, the seller submits the listing to the commerce system 10. At block 818, the commerce system 818 receives the listing of the offering. At block 821, the commerce system 10 analyzes the listing. For example, the commerce system 10 could review the submitted listing by automatically checking the fields and setting for completeness (e.g., amount of text description, photo on listing, etc.), suggest formatting (e.g., bold type), suggest text, suggest images, and/or a pricing strategy (e.g., use a seller fixed-price with no reserve price information).

At block 824, if suggestions are to be made to the seller based on the analysis of the listing, control passes to block 827. If, at block 824, suggestions are not to be made to the seller based on the analysis of the listing, control passes to block 830.

At block 830, the auction continues.

At block 827, the suggestions are sent to the seller. At block 833, the seller receives the suggestions. At block 836, the seller determines whether to accept the suggestions. If, at block 836, the seller, determines to accept the suggestions, control returns to block 815 and the updated listing is sent to the commerce system 10.

In one embodiment, the analyzing of the listing at block 821 may check for a valid VIN number (Vehicle Identification Number) when listing a vehicle to reduce the insurance premiums. The commerce system 10 may check the vehicle VIN against a vehicle history database to double check against title fraud, odometer rollback, etc. In one embodiment, the vehicle database may be stored locally on the commerce system 10 or remote on a third party database, such as an auction insurance company. If the vehicle history database is stored remotely, the remote database could report back problems to the commerce system 10.

Figure 9:
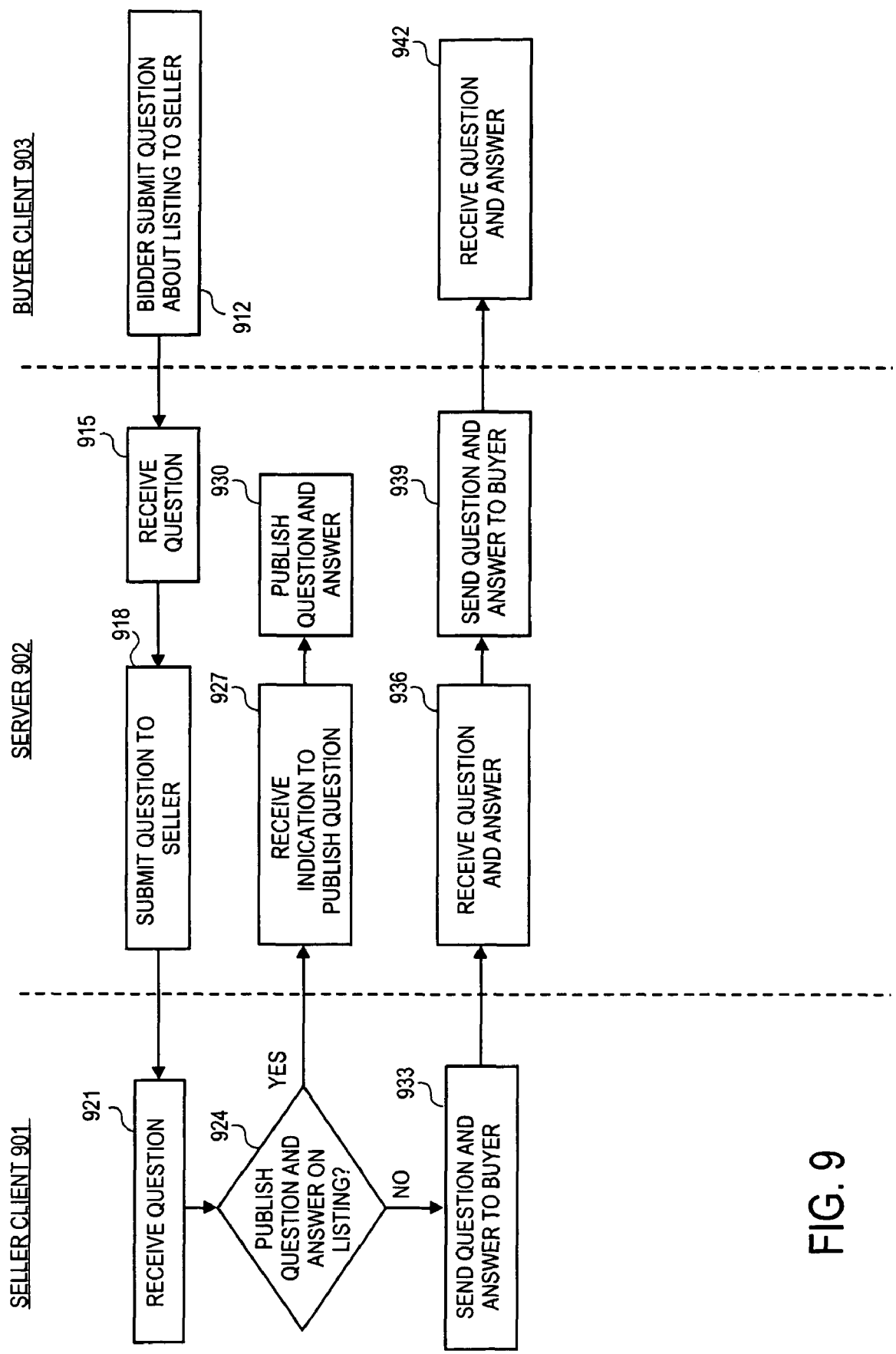
FIG. 9 is a flow chart illustrating a method, according to an exemplary embodiment of the present invention, to facilitate seller-controlled publication of question and answer information.

FIG. 9 illustrates a process flow of one embodiment of a seller-controlled publication of question and answer sets. The processes are separated into the processes of a seller client side 901, a buyer client side 903, and a server side 902. At block 912, a bidder submits a question about a listing to a seller via the commerce system 10. At block 915, the commerce system 10 receives the question. At block 918, the commerce system 10 sends the question to the seller of the listing. At block 921, the seller receives the question. At block 924, if the seller determines to publish the question on the listing, control passes to block 927. At block 924, if the seller determines not to publish the question and an answer to the question on the listing, control passes to block 933. At block 927, the commerce system 10 receives the indication to publish the question and answer. At block 930, the question and answer are published in association with the listing via the page server 12. At block 933, the seller sends the question and answer to the bidder. At block 936, the commerce system 10, receives the question and answer. At block 939, the commerce system sends the question and answer to the buyer that asked the question. At block 942, the bidder receives the question and answer.

It should be understood that the bidder need not send the question to the seller about the listing via the commerce system 10. Alternatively, the bidder may communicate the question directly to the seller (e.g., via email), and also, the bidder may determine to communicate the answer to the question directly to the bidder. In this fashion, the seller may provide different responses to the same question to different bidders.

FIG. 10 provides an exemplary embodiment of the user interface 500 created at block 110 in FIG. 3 to relay offering options to the seller and collect information on the seller's item. The user interface 500 gives the seller the option to allow a bidder to buy the item at a seller fixed-price offer 514.

FIG. 11 provides an exemplary embodiment of the category list 517 and search criteria request generated by block 420 in FIG. 4. A buyer can generate search criteria (block 440) by typing the search criteria (block 516).

FIG. 12 provides an exemplary embodiment of the item index page generated at block 460 in FIG. 4. A possible placement of the fixed-price purchase process availability icon 518 is shown next to the item. Also displayed in the embodiment of the item index page is a list of prices 514 which could either be the current bid or the seller fixed-price offer if available. It is understood that the invention is not limited to the fields as displayed in FIG. 12.

FIG. 13 shows an exemplary embodiment of the markup language document generated at block 270 in FIG. 5. Regular auction panel 503 is generated (blocks 240 and 400). Fixed price purchase process panel 504 is generated (block 250) in FIG. 5. The buyer can submit a bid 520 or, depending on the availability of the fixed price purchase process, can start the fixed price purchase process in panel 504.

Figure 14:
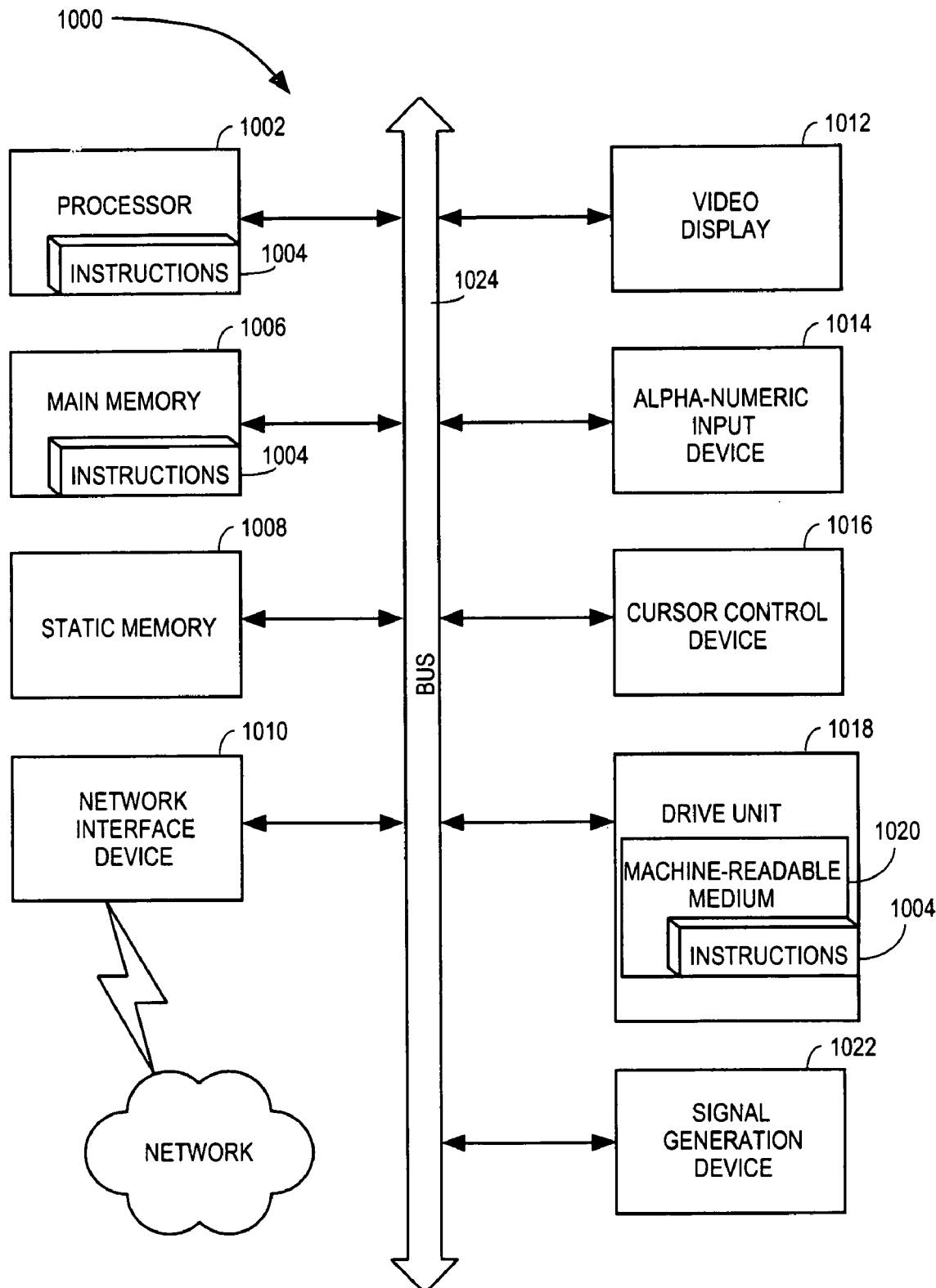
FIG. 14 shows a diagrammatic representation of machine in the exemplary form of a computer system.

FIG. 14 shows a diagrammatic representation of machine in the exemplary form of a computer system 1000 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance, set-top box (STB) or any machine capable of executing a sequence of instructions that specify actions to be taken by that machine.

The computer system 1000 includes a processor 1002, a main memory 1006 and a static memory 1008, which communicate with each other via a bus 1024. The computer system 1000 may further include a video display unit 1012 (e.g., a liquid crystal display (LCD) or a cathode ray tube (CRT)). The computer system 1000 also includes an alphanumeric input device 1014 (e.g., a keyboard), a cursor control device 1016 (e.g., a mouse), a disk drive unit 1018, a signal generation device 1022 (e.g., a speaker) and a network interface device 1010.

The disk drive unit 1018 includes a machine-readable medium 1020 on which is stored a set of instructions (i.e., software) 1004 embodying any one, or all, of the methodologies described above. The software 1004 is also shown to reside, completely or at least partially, within the main memory 1006 and/or within the processor 1002. The software 1004 may further be transmitted or received via the network interface device 1010. For the purposes of this specification, the term "machine-readable medium" shall be taken to include any medium which is capable of storing or encoding a sequence of instructions for execution by the machine and that cause the machine to perform any one of the methodologies of the present invention. The term "machine-readable medium" shall accordingly be taken to included, but not be limited to, solid-state memories, optical and magnetic disks, and carrier wave signals. Further, while the software is shown in FIG. 14 to reside within a single device, it will be appreciated that the software 1004 could be distributed across multiple machines or storage media, which may include the machine-readable medium.

In the foregoing detailed description, the method and system of the present invention has been described with reference to specific exemplary embodiments thereof. It will, however, be evident that various modifications and changes may be made thereto without departing from the broader scope of the present invention. In particular, the separate blocks of the various block diagrams represent functional blocks of methods or apparatuses and are not necessarily indicative of physical or logical separations or of an order of operation inherent in the scope of the present invention. For example, the blocks of FIGS. 3, 4, 5A, 5B, 6A, 6B, 6C, 6D, 7A, 7B, and 7C, 8, and 9 represent portions of a method, which, in some embodiments, may be reordered or may be organized in parallel rather than in a linear or step-wise fashion. The present specification and figures are accordingly to be regarded as illustrative rather than restrictive.

What is claimed is:

1. A method comprising:
receiving a question associated with a listing for an item during an auction price-setting process;
receiving an indication from a seller to authorize provision of an answer to the question; and
selectively providing the answer to the question based on the indication, the providing of the answer being performed by a module implemented by a processor of a machine and including presenting the answer within a web page that displays the item as the listing for the item.

2. The method of claim 1, the receiving of the question including receiving the question over a communications network.

3. The method of claim 2, the receiving of the question including receiving the question via an electronic mail message.

4. The method of claim 2, including receiving the question from a bidder.

5. The method of claim 2, including receiving the question from the seller.

6. The method of claim 1, comprising providing the question in conjunction with the providing of the answer.

7. The method of claim 6, the providing of the question including publishing the question on the listing for the item.

8. The method of claim 1, the providing of the answer including providing the answer over a communications network.

9. The method of claim 8, the providing of the answer including providing the answer via an electronic mail message.

10. The method of claim 1, comprising receiving the answer from the seller over a communications network.

11. A system comprising:
a processor coupled to a memory through a bus; and
instructions to be executed from the memory by the processor to cause the processor to perform operations comprising:
receiving a question associated with a listing for an item during the auction price-setting process,
an indication from a seller to authorize provision of an answer to the question, and
selectively providing the answer to the question based on the indication by presenting the answer within a web page that displays the item as the listing for the item.

12. The system of claim 11, the question being received over a communications network.

13. The system of claim 12, the question being received via an electronic mail message.

14. The system of claim 12, the question being received from a bidder.

15. The system of claim 11, the auction price-setting process causing the processor to provide the question in conjunction with the providing of the answer.

16. The system of claim 11, including publishing the question on the listing for the item.

17. The system of claim 11, including providing the answer over a communications network.

18. A system comprising:
means for receiving a question associated with a listing for an item during an auction price-setting process;
means for receiving an indication from a seller to authorize provision of an answer to the question; and
means for selectively providing the answer to the question based on the indication by presenting the answer within a webpage that displays the item as the listing for the item.

19. A machine-readable medium comprising instructions, which when implemented by one or more processors, cause the one or more processors to perform operations comprising:
receiving a question associated with a listing for an item during an auction price-setting process;
receiving an indication from a seller to authorize provision of an answer to the question; and
selectively providing the answer to the question based on the indication by presenting the answer within a web page that displays the item as the listing for the item.

* * * * *

UNITED STATES PATENT AND TRADEMARK OFFICE
CERTIFICATE OF CORRECTION

| | | |
|---|---|---|
| PATENT NO. | : 7,831,484 B2 | Page 1 of 1 |
| APPLICATION NO. | : 10/749431 | |
| DATED | : November 9, 2010 | |
| INVENTOR(S) | : Brian A. Grove et al. | |

It is certified that error appears in the above-identified patent and that said Letters Patent is hereby corrected as shown below:

In column 2, line 39, delete "61D" and insert -- 6D --, therefor.

In column 11, line 47, delete "examples)" and insert -- examples). --, therefor.

Signed and Sealed this

Twenty-fifth Day of January, 2011

David J. Kappos
*Director of the United States Patent and Trademark Office*